Figure 1:
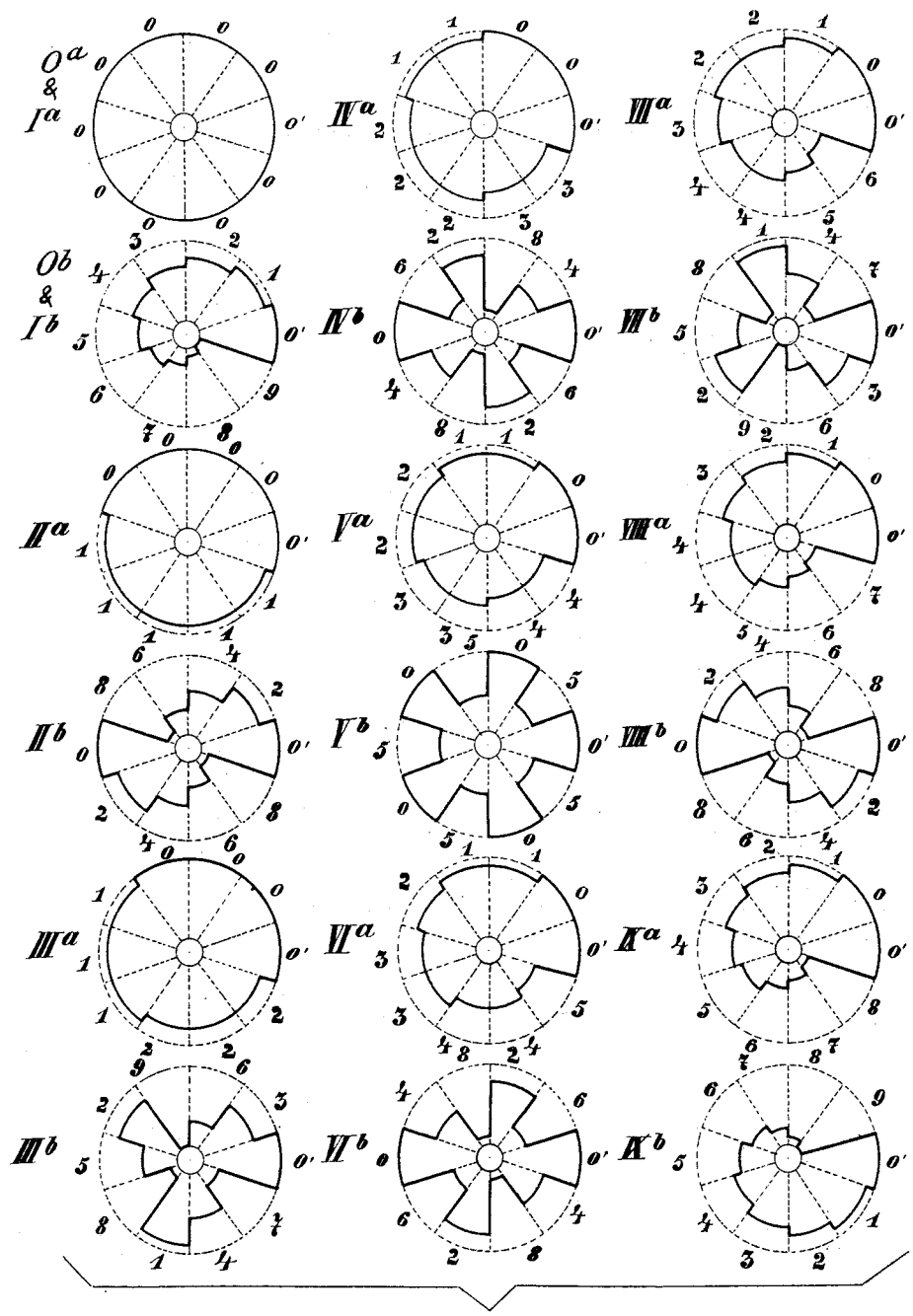

(No Model.) 12 Sheets—Sheet 1.

O. STEIGER.
MULTIPLYING OR DIVIDING MACHINE.

No. 538,710. Patented May 7, 1895.

Attest:
M. C. Massie
F. H. Schott

Inventor:
Otto Steiger
by Max Engel
Atty.

(No Model.)  12 Sheets—Sheet 4.

O. STEIGER.
MULTIPLYING OR DIVIDING MACHINE.

No. 538,710.  Patented May 7, 1895.

Fig. 4.

Attest:
M. C. Massie.
F. H. Schott.

Inventor:
Otto Steiger
by Max Fenzü
Atty.

(No Model.) 12 Sheets—Sheet 5.
O. STEIGER.
MULTIPLYING OR DIVIDING MACHINE.
No. 538,710. Patented May 7, 1895.
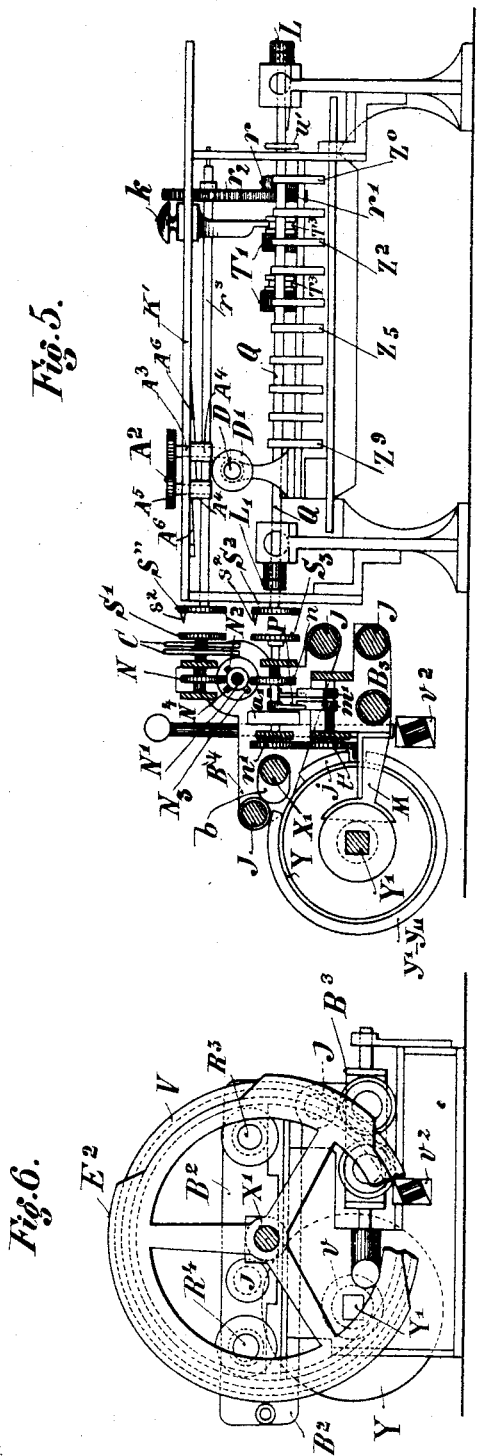

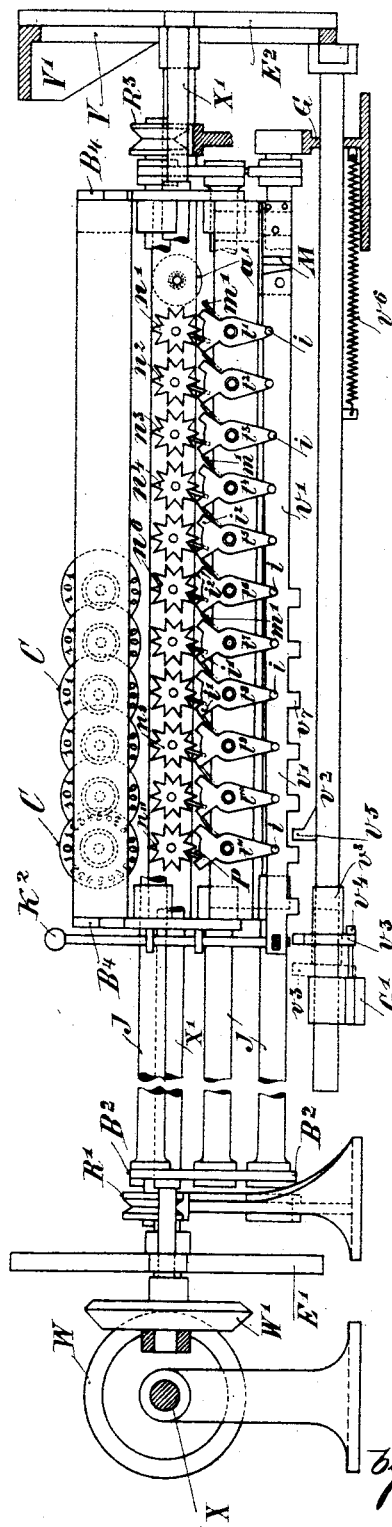

(No Model.) 12 Sheets—Sheet 7.

O. STEIGER.
MULTIPLYING OR DIVIDING MACHINE.

No. 538,710. Patented May 7, 1895.

Attest:
M. C. Massie
F. H. Schott

Inventor:
Otto Steiger
by Max Geigü
Atty.

(No Model.) 12 Sheets—Sheet 8.
O. STEIGER.
MULTIPLYING OR DIVIDING MACHINE.
No. 538,710. Patented May 7, 1895.
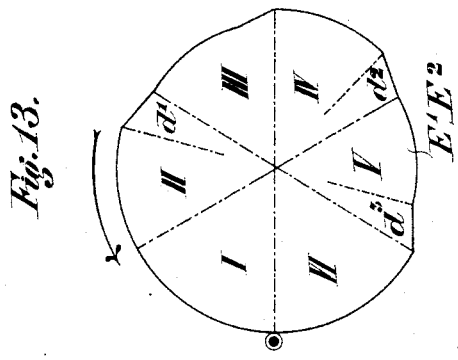
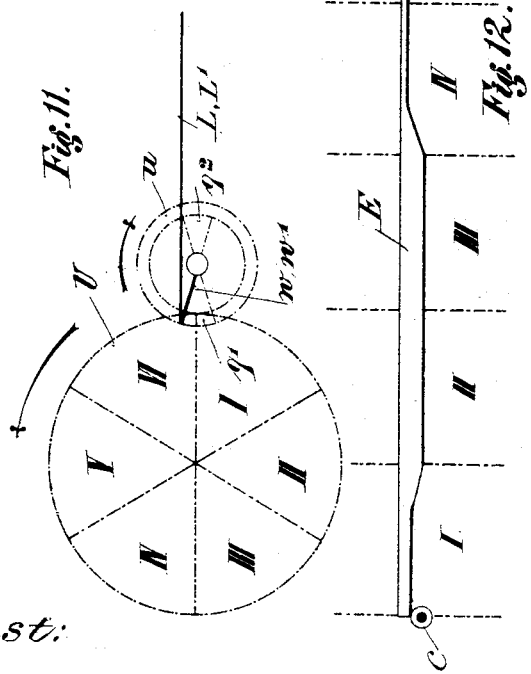
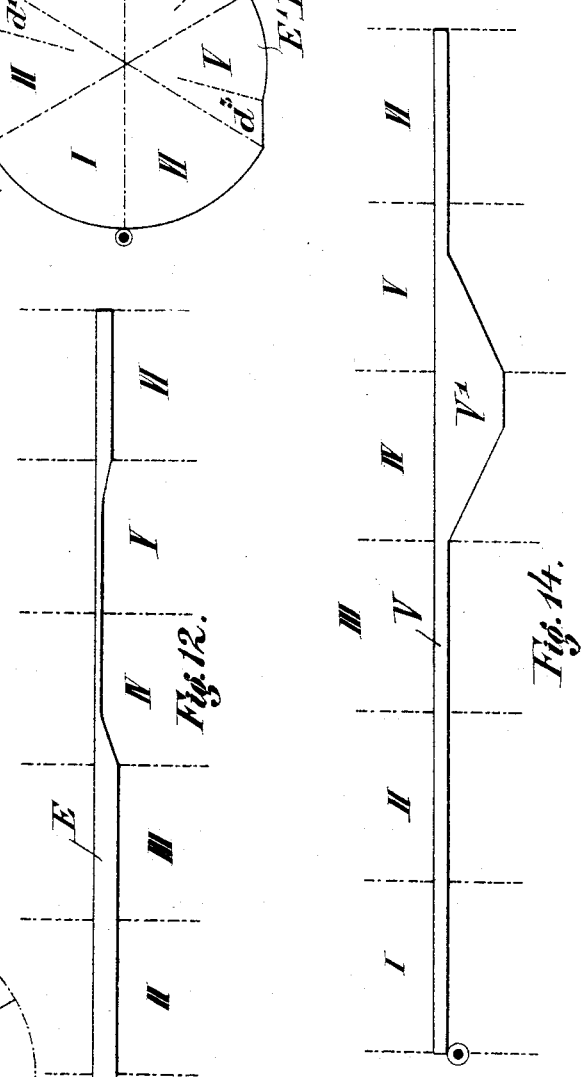
Attest:
M. C. Massie.
F. H. Schott.
Inventor:
Otto Steiger
by Mackenzie
Atty.

(No Model.) 12 Sheets—Sheet 9.
O. STEIGER.
MULTIPLYING OR DIVIDING MACHINE.
No. 538,710. Patented May 7, 1895.
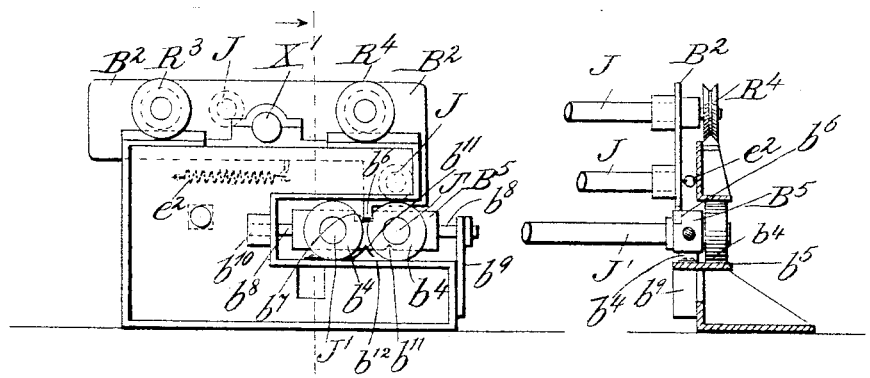
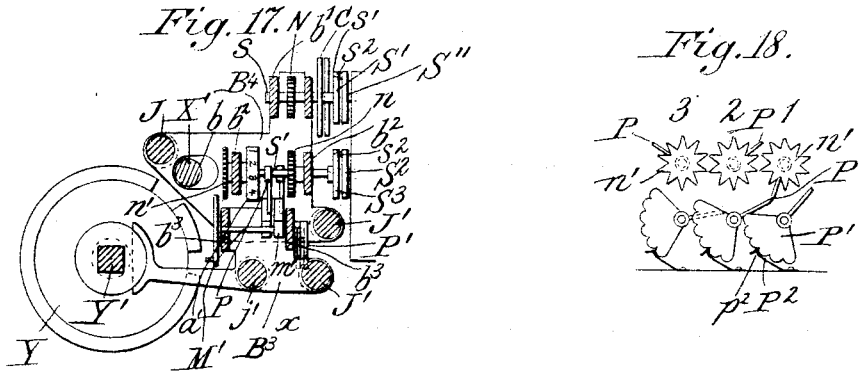
Attest:
F. H. Schott
M. C. Massie.
Inventor:
Otto Steiger
by Max Senga
attorney.

(No Model.)  12 Sheets—Sheet 10.

O. STEIGER.
MULTIPLYING OR DIVIDING MACHINE.

No. 538,710.  Patented May 7, 1895.

Fig. 19.

Attest:
M. C. Massie
F. H. Schott

Inventor
Otto Steiger
by Mason Fenwick
Atty

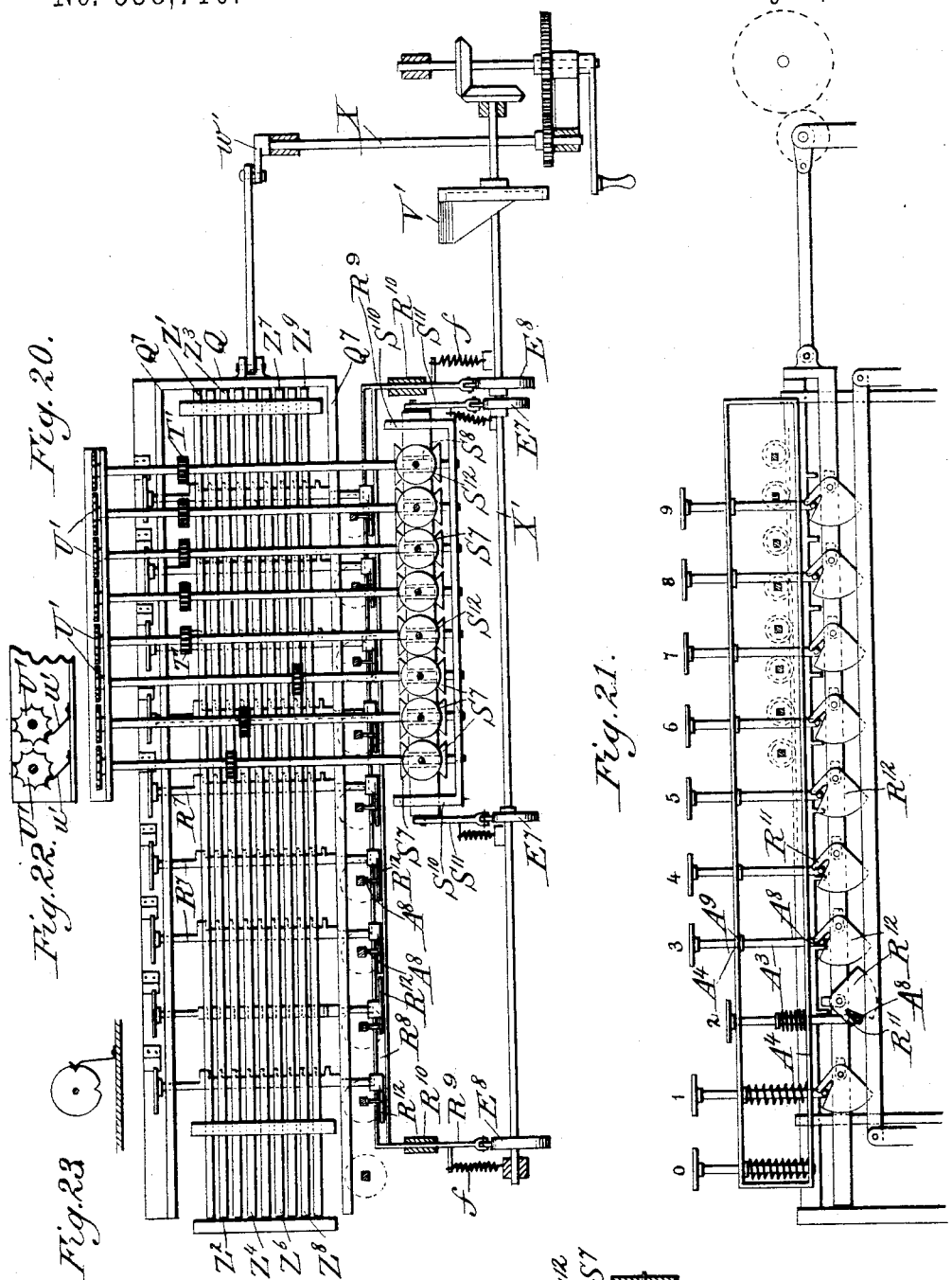

(No Model.) 12 Sheets—Sheet 12.
O. STEIGER.
MULTIPLYING OR DIVIDING MACHINE.
No. 538,710. Patented May 7, 1895.
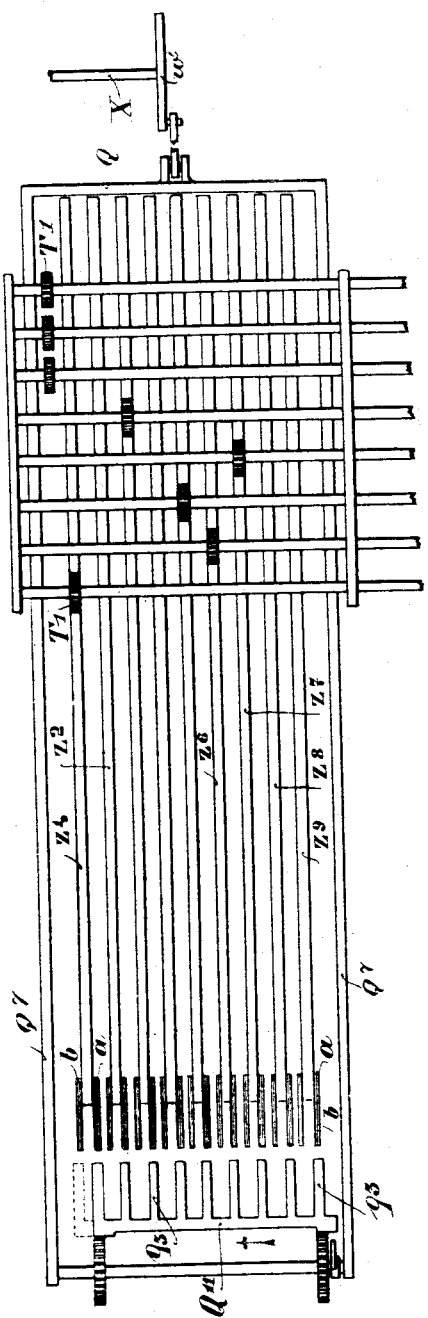
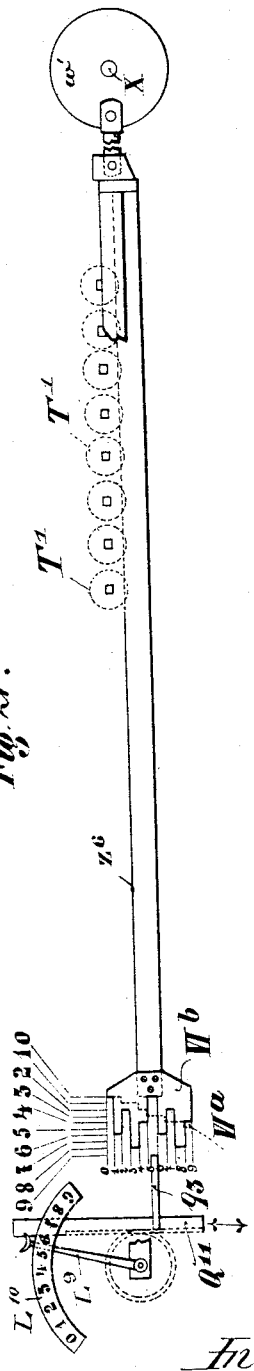
Attest:
M. C. Massie
F. H. Scholl
Inventor:
Otto Steiger
by May Senzú
Atty.

UNITED STATES PATENT OFFICE.

OTTO STEIGER, OF MUNICH, GERMANY.

MULTIPLYING OR DIVIDING MACHINE.

SPECIFICATION forming part of Letters Patent No. 538,710, dated May 7, 1895.

Application filed August 12, 1893. Serial No. 482,980. (No model.) Patented in Germany December 23, 1892, No. 72,870; in France March 14, 1893, No. 228,628, and in Switzerland September 1, 1893, No. 6,787.

*To all whom it may concern:*

Be it known that I, OTTO STEIGER, a citizen of Switzerland, residing at Munich, Bavaria, in the German Empire, have invented certain new and useful Improvements in Arithmetical Machines, (patented in France, No. 228,628, dated March 14, 1893; in Switzerland, No. 6,787, dated September 1, 1893, and in Germany, No. 72,870, dated December 23, 1892,) of which the following is a specification.

My invention relates to improvements in arithmetical machines or calculators, and particularly to that class of machines adapted for making calculations in multiplication, division, subtraction, or addition.

As the differences between a machine embodying my invention and those previously constructed for performing the above-mentioned four operations are most readily pointed out in connection with the operation of multiplication, the invention will first be described as if designed for that purpose only, after which the manner of changing it to perform the other calculations will be entered into.

Multiplication is often defined as a short method of addition, and, in most of those machines previously constructed, a product was arrived at, not by the short method of multiplication, but by the long method of successive additions. For example, if it were desired to multiply, say, 518 by 5, the machines above referred to contained such mechanism that 518 would be added to itself five times, thus: 518+518+518+518+518. The principal disadvantage of this construction is the loss of time in operating the machine, and the great additional wear of the various parts. For instance, in the above example, when the machine is properly set at 518, it becomes necessary to turn a crank, push a key, or operate a lever five times. The wear and loss of time becomes more apparent, in such machines, as the number of figures in the multiplier, and their relative values, increase. For example, if, instead of multiplying 518 by 5, it is desired to multiply it by 99, the moving parts must be revolved either ninety-nine times, or, in the better class of machines, first, nine times, and then nine times again, a shifting of the registering mechanism taking place between the first and second multiplication by nine, in order that the first nine may have its proper value of nine tens, this shifting being done by hand.

The chief object of my invention is to avoid the above-mentioned disadvantages, and this result is accomplished by providing my machine with such mechanism, that the product of one number by another is obtained, not by the long method of successive additions, but by the short method of multiplication. In other words, a machine embodying my invention performs its operation in a manner similar to the way in which it is done by the written process. For instance, in multiplying the above number, 518 by 5, the products of 8 multiplied by 5, 1 multiplied by 5, and 5 multiplied by 5 are obtained, in the written operation (as it is termed) from a table of products (the multiplication table so-called) committed to memory by the operator, who thus obtains the numbers, 40, 5, and 25. The first number, 40, may be considered as composed of two quantities, the tens and the units, viz: four tens and no units. The second number, 5, is considered as composed of two quantities, as before, viz: no tens and five units, the third number, 25, being considered as containing two quantities also, viz: two tens and five units. Moreover, one ten of the number first obtained is equal to one unit of the number next obtained. One ten of the latter is equal to one unit of the third number, and one ten of the latter may be considered as equal to one unit of a fourth number, arising by multiplying a fictitious zero in the multiplicand by the multiplier, five, this product being zero. Therefore, the computer, as he proceeds, mentally adds the tens of the first product to the units of the second product, the tens of the latter product to the units of the third product, and the tens of the latter to the units of the fictitious product above referred to. When the addition has been made, he obtains the total product. In my machine, the operation of multiplication is carried out in the same way. As the partial products in the written calculation are obtained from a table of products or multiplication table committed to memory, so, in my machine, one part of the mechanism obtains the partial products from a mechanical representative of the said table of products, which mechanical representative I term the "controlling mechanism," as it controls the subsequent action of the whole machine.

That part of the mechanism above referred to which obtains the partial products from the controlling mechanism, I term the "transmitting mechanism," as it transmits the partial products to another mechanism, or as it may be called the totalizing mechanism which I term the "combining and registering mechanism," since it takes the partial products from the transmitting mechanism, and, after giving to each quantity of each partial product its proper value, whether tens or units, combines them in the proper manner and registers or indicates the total result in any suitable manner, preferably, on a series of dials. There is, however, one principal difference between the manner in which the computation is done by the written process and that in which it is done by a machine embodying my invention, which difference is as follows:

The computer obtains the partial products from his memorized table of products one after the other, and, in so obtaining them, he gets both the units and the tens of each partial product at the same time, while, in my machine, the transmitting apparatus obtains the tens of all the partial products first, and transmits them to the totalizing or combining and registering mechanism, whereupon it then obtains the units of all the partial products and transfers them to the combining and recording mechanism, which, by a proper arrangement of them, distinguishes between the units and the tens, and adds them so as to give the correct total product.

The three methods under which the result is obtained may be best shown in tabulated form, as follows:

By the old forms of machines $$518+518+518+518+518=2,590.$$

By the written operation (the partial products all being set down in full instead of having their tens carried by the mental operation of the computer), $$\begin{array}{r} 518 \\ 5 \\ \hline 40 \\ 05 \\ 25 \\ \hline 2590 \end{array}$$

By my machine, as follows:

$$518 \times 5$$

$$\begin{array}{rl} 204 & \text{tens.} \\ 550 & \text{units.} \\ \hline 2590 & \end{array}$$

The fundamental distinction, then, between my machine and most of those formerly known, is this: The latter class of machines are, in fact, mere adding machines, by a proper manipulation of which multiplication may be performed, while my machine is, in fact, a multiplying machine which may be used for addition also.

Of course, it is understood that the machines previously known, and my machine, may also be used for subtraction and division, but this matter will not be entered into at present, as the real distinction is seen more plainly in the consideration of the operation of multiplication.

Many other objects are attained by my construction, which need not be mentioned, as they will be apparent to those skilled in the art, after a clear comprehension of the invention.

My invention consists, broadly, in mechanism which I class hereinafter as the "controlling mechanism," or "controlling devices," which may be said to be a mechanical representative of the multiplication table, from 0 multiplied by 0 to 9 multiplied by 9, inclusive, and to contain all the products from zero to eighty-one. This controlling mechanism embodies the essence of one part of my invention, and, as will be apparent from the description hereinafter, may be arranged in various forms.

In the forms of machines herein described which embody my invention, the controlling mechanism is arranged in pairs of controlling devices, one device of each pair being graduated to correspond to the tens of all the partial products from 0 multiplied by 0 to 9 multiplied by 9, while the other device of the same pair is graduated to correspond to the units of all of said products. The term "graduation," as I use it herein, is intended to indicate that, whatever the form of controlling mechanism employed, it is arranged to produce the varying movements of the registering mechanism, in multiples of a certain unitary movement. This will be better understood after the description of the construction and operation of the various forms herein mentioned.

My invention also consists in the combination, with the controlling devices, of a totalizing device, by means of which the various products are united either by addition or subtraction, and the final result displayed by suitable means, such as a series of dials.

My invention consists, further, in the apparatus which transmits the products from the controlling mechanism to the combining and registering device, and which I term the "transmitting mechanism."

My invention also consists in an indicating mechanism, by means of which, in multiplication, the multiplier is indicated on the machine as soon as the operation is completed, this indicating mechanism indicating the quotient when the apparatus is used for division.

My invention consists, further, in such features, details and combinations of parts as will first be described in connection with the accompanying drawings, and then particularly pointed out in the claims.

In the drawings, Figures 1 to 18 illustrate one form of mechanism embodying my invention. Figs. 19 to 25 illustrate a second form of mechanism embodying my invention. Figs. 26 and 27 illustrate a third form.

Figure 2:
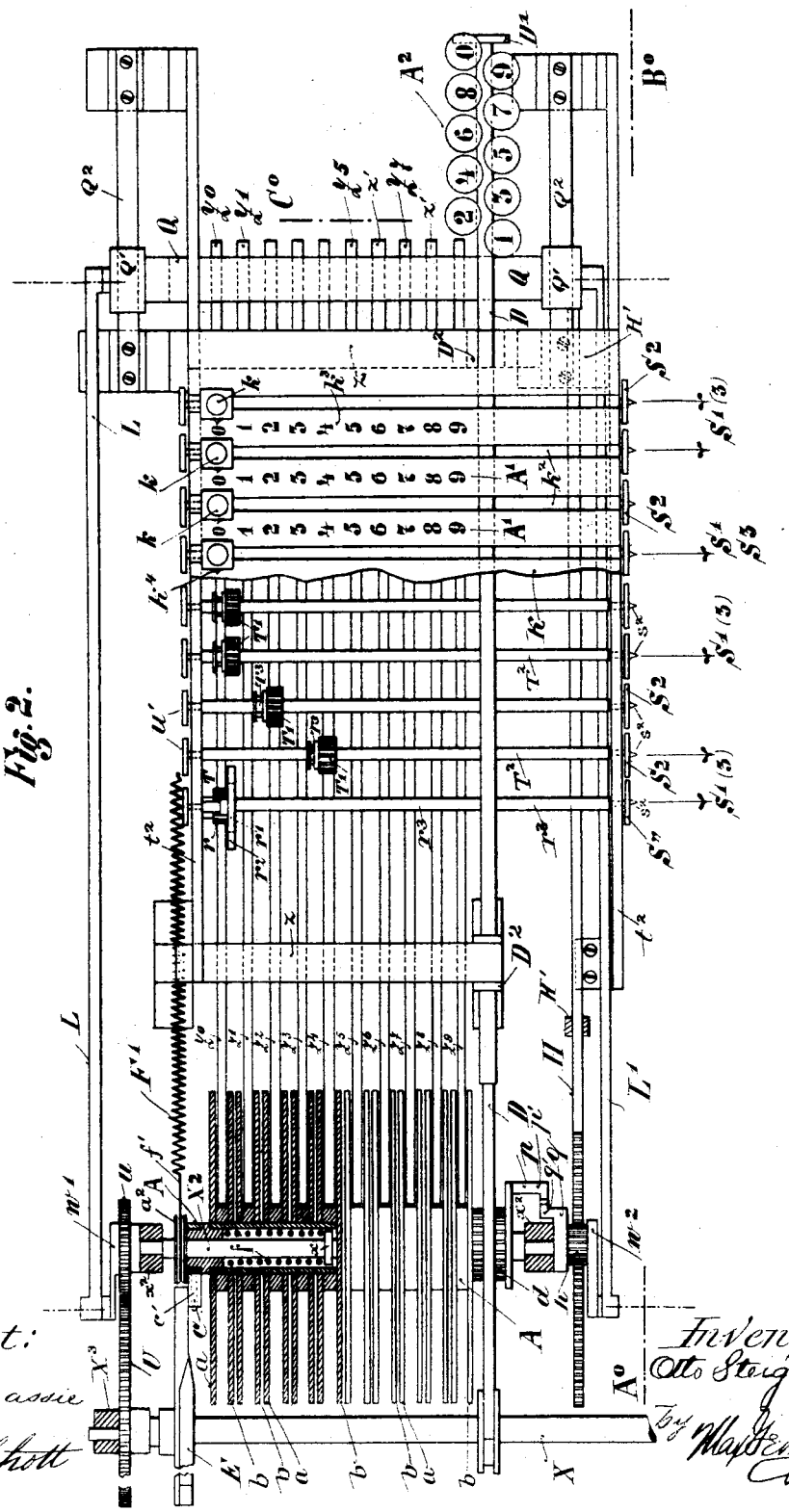
Figure 3:
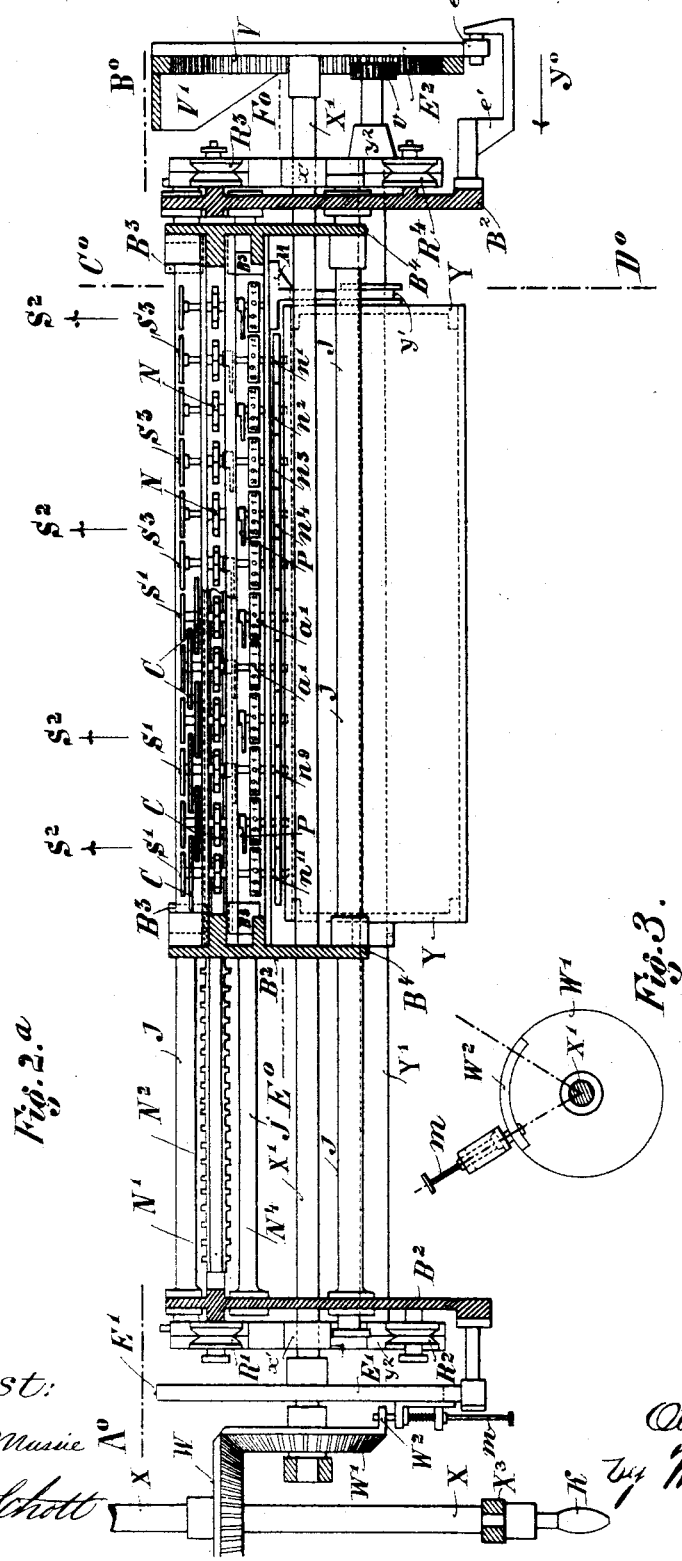
Figure 10:
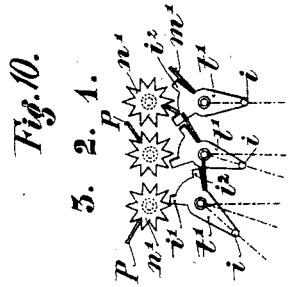
Figure 9:
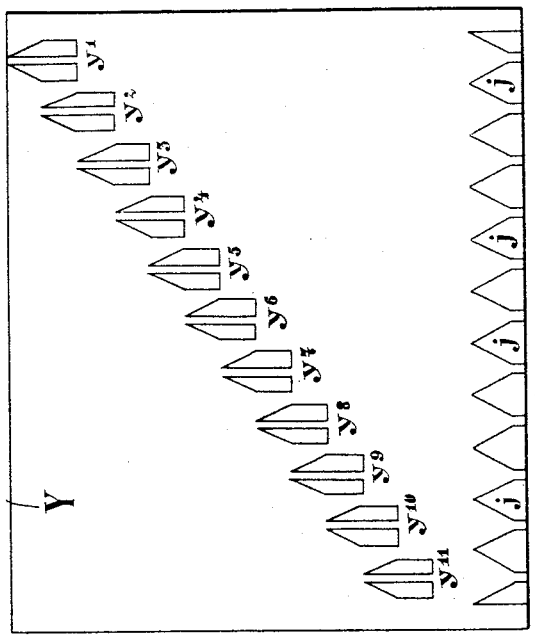
Figure 8:
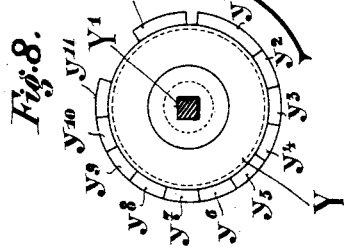

In the views illustrating the first form of mechanism, Fig. 1 is a diagrammatic view showing the controlling mechanism in the form of recessed disks. Figs. 2 and $2^a$ together constitute a plan view of the machine and will be referred to hereinafter as "Fig. 2." Fig. 3 is a detail view showing the mechanism for changing the machine from its condition of multiplication to division and vice versa. Fig. 4 is a longitudinal vertical section on the line $A^0 B^0$, Fig. 2. Fig. 5 is a transverse vertical section on the line $C^0 D^0$, Fig. 2. Fig. 6 is an end view of a part of the totalizing mechanism. Fig. 7 is a longitudinal vertical section on the line $E^0 F^0$, Fig. 2. Fig. 8 is an end view of the cylinder Y. Fig. 9 is a developed view of the same. Fig. 10 is a detail view of the transferring-dogs and star-wheels. Fig. 11 is a diagrammatic end view of the cam-wheel E. Fig. 12 is a developed view of the same. Fig. 13 is an end view of the cam-wheels E' and $E^2$. Fig. 14 is a developed view of the periphery of the cam-wheel $E^2$. Fig. 15 is a detail end view of the register-carriage and framework. Fig. 16 is a detail section of the same, partly in elevation. Fig. 17 is a transverse section of the register mechanism, showing the relative positions of the parts when the pin-disks and perforated disks are coupled together. Fig. 18 is a detail view showing the means by which the dog-spindles are held against accidental rotation.

In the views illustrating the second form of mechanism embodying my invention, Fig. 19 is a diagrammatic plan view showing the arrangement of or manner of graduating the controlling mechanism employed in this form of machine. Fig. 20 is a plan view of so much of the mechanism as is necessary to illustrate the invention. Fig. 21 is a side view of the same. Figs. 22, 23, 24 and 25 are detail views which will be referred to hereinafter.

In the views showing the third form of mechanism embodying my invention, Fig. 26 is a plan view, and Fig. 27 is a side elevation, of so much as is necessary to illustrate the invention.

In describing the first form of mechanism embodying my invention, and shown in Figs. 1 to 18, it becomes advisable, for the sake of perspicuity, to consider it under the following heads: First, the controlling devices, and the means for setting them to any required position; second, the transmitting mechanism, which transfers the various partial products, determined by the controlling devices, to the totalizing or combining and registering mechanism; third, the totalizing or combining and registering mechanism, which takes the partial products from the transmitting mechanism and combines them, either by adding or subtracting, and indicates or shows the final result on suitable dials; fourth, the indicating mechanism, which partakes so much of the nature of the remainder of the machine, as to be more readily described under three subdivisions also, namely, the controlling mechanism, the transmitting mechanism, and the totalizing mechanism. For the sake of brevity, the description of each of these three subdivisions will be combined with the description of its appropriate main division of the mechanism.

It is to be carefully observed, in connection with the above enumeration of the four principal parts, that a distinction is here drawn between the use of the terms "indicating mechanism" and "registering mechanism," the former relating to one particular branch of the apparatus, which indicates the numbers on the keys depressed, while the latter refers to that mechanism which registers the products obtained by the transmitting mechanism.

The registering mechanism is an essential feature of the machine, while the indicating mechanism is only a convenience, it being possible to construct and operate a machine without it, as the operator might carry, in his memory, the numbers on the keys depressed, or write them down in succession as the operation proceeded. It should be observed, however, that, though only a convenience, this indicating mechanism is a most important convenience, since it serves as a check, to show whether, or not, the proper keys have been depressed.

In the machine about to be described, the controlling mechanism is embodied in a series of disks provided with recesses, which control the action of the machine by determining either the point at which the transmitting mechanism starts, or that at which it stops, according to whether the machine is set for multiplication, or for division. If, then, the apparatus be considered with regard to the operation of multiplication only, the controlling mechanism may be called the "starting mechanism," and will be so referred to hereinafter.

The controlling mechanism is constructed as follows: A, is a hollow disk-operating shaft, loosely mounted on a revoluble shaft, $X^2$, Fig. 2, which has a collar, $x$, near its central portion, and is surrounded by a helical spring, $f$, which rests in an internal recess in the disk-operating shaft, A, bearing against the collar, $x$, at one end, and against the inner face of the shoulder formed by the termination of the recess, the spring thereby tending to crowd the disk-operating shaft, A, longitudinally on the revoluble shaft, $X^2$, which is journaled in suitably-arranged boxes, $x^2$, and is provided at each end with a crank, $w'$, $w^2$, fixed to the shaft, to which cranks are attached a pair of connecting rods, L, L', united at their ends by a cross-bar, Q, which has a slide-box, Q', at each end, these slide-boxes moving on slides, Q², carried by the frame of the machine.

For the purpose of imparting motion to the shaft, X², and thereby operating the cranks and connecting rods, the said shaft, X², is provided with a gear pinion, $u$, fixed on one end of the shaft, between the journal-box and the crank, and into the pinion is meshed a main driving gear-wheel, U, fixed on a main driving shaft, X, mounted in bearings at X³, and actuated by a hand-crank, K.

Upon the disk-operating shaft is mounted a series of nine pairs of starting devices, and another pair, O, which relates to the indicating mechanism, and whose purpose will be hereinafter described, each pair consisting of two disks, $a$ and $b$, whose interval of separation is greater than the distance between adjacent pairs, as will be plain from Fig. 2. The disks, $0^a$, $0^b$, will be referred to as the "zero disks," the disk, I$^a$, being considered as the first disk. All the disks, with the exception of the disks, $0^a$ and I$^a$, are provided with recesses extending from the periphery toward the center, the depth of each recess being proportionate to the number which it represents in the product. In other words, the starting devices are graduated by graduating the depth of the recesses. Each disk, $a$, of each pair may be termed the "tens disk," and each disk, $b$, the "units disk." Furthermore, the pairs are arranged in regular order from zero to nine, as indicated by the Roman numerals, 0 to IX, in Figs. 1 and 2, and the said numerals indicate the products to be found on each pair of disks. For instance, on the first pair, I, are recesses which represent all the products from 1 multiplied by 0, 1 multiplied by 1, 1 multiplied by 2, &c., up to, and including 1 multiplied by 9; in the second pair, II, all the products of 2 multiplied by 0, 2 multiplied by 1, 2 multiplied by 2, 2 multiplied by 3, &c., up to and including 2 multiplied by 9; in the third pair of disks, III, all the products of 3 multiplied by 0, 3 multiplied by 1, 3 multiplied by 2, 3 multiplied by 3, &c., up to, and including, 3 multiplied by 9; and so on to the ninth pair of disks, IX, which contains all the products of 9 multiplied by 0, 9 multiplied by 1, 9 multiplied by 2, 9 multiplied by 3, &c., up to, and including 9 multiplied by 9. Of each pair, each disk may be considered as divided into ten sectors, each of which subtends the same angle, and is recessed, or not, according to the number intended to be represented by such sector. To explain this more clearly, reference may be had to Fig. 1, where it will be seen that the disk, I$^b$, has ten equal sectors, the zero sector of which, marked, $o'$, is the sector which gives the product of 1 multiplied by 0, and, as this product is zero, as will be observed, this sector is not recessed at all. The next or first sector, (in a sinistral revolution,) is marked 1, as this represents the product obtained by multiplying 1 by 1. This sector, therefore, is recessed one graduation. The next sector is marked 2, as it represents the product obtained by multiplying 1 by 2, and this sector is recessed two graduations or twice the depth of the first sector. The third sector is marked 3, as it indicates the product obtained by multiplying 1 by 3, and it is recessed three graduations. Thus, the recesses of the sectors are graduated in depth up to the ninth sector, which is numbered 9, because it represents the product obtained by multiplying 1 by 9, and, furthermore, it is recessed nine graduations, or nine times the depth of the recess in the sector marked 1. As all the products from 1 multiplied by 1 up to 9 multiplied by 9 contain but one figure, it will be understood that the tens disk of the first pair (marked I$^a$), is not recessed. Referring, now, to the second pair, indicated by the Roman numeral, II, and comprising a tens disk, $a$, and a units disk, $b$, it will be seen that the latter is divided into ten equal sectors also, and that the zero sector, marked $o'$, is not recessed, as it represents the product obtained by multiplying 2 by 0, which is zero. The first sector, (in a sinistral revolution,) is marked 2, because it indicates the product obtained by multiplying 2 by 1, and it is, therefore, recessed two graduations, or twice the depth of the homologous sector on the disk, I$^b$. The second sector is marked 4, as it represents the product obtained by multiplying 2 by 2, and, therefore, it is recessed four graduations, or four times the depth of the recess in the first sector on the disk, I$^b$, which recess, it will be plain, is the unit graduation of the entire series. The third sector of the disk, II$^b$, is recessed six graduations, and is marked 6, since it indicates the product of 2 by 3. The next sector is recessed eight graduations and is marked 8, as it indicates the product of 2 by 4. Thus far, the contiguous portions or homologous sectors in the tens disks, II$^a$, have not been recessed, because all the products so far given on the units disk, II$^b$, running from 2 multiplied by 0 up to 2 multiplied by 4, that is, from 0 to 8, contained only one figure, but the next sector of the units disk, II$^b$, it will be seen, is not recessed at all, and is marked 0, while the homologous sector in the tens disk, II$^a$, is recessed one graduation, for the reason that the two said homologous sectors, together, represent the product obtained by multiplying 2 by 5, which is 10, and requires two digits to represent it—one ten and no units. The next sectors of the disks represent the product obtained by multiplying 2 by 6, which is 12, and, as this product contains two digits—one ten and two units—the units disk, II$^b$, has its said sector recessed two graduations, while the tens disk, II$^a$, has its said homologous sector recessed one graduation, to indicate the one ten in the said product. As the next highest product of two is fourteen, or 2 multiplied by 7, the next sectors of said disks are recessed correspondingly, the sector of the units disk being recessed four graduations, while the tens disk is recessed one graduation.

The recessing is carried out by successive proper graduations, through the next sectors of the two disks, representing the product of 2 multiplied by 8, and 2 multiplied by 9. The remaining disks of the series are correspondingly recessed and give the products up to 9 multiplied by 9, as shown on the last pair of disks, where the ninth sector of the units disk, $IX^b$, is recessed one graduation, while the homologous sector of the tens disk, $IX^a$, is recessed eight graduations, the said sectors of the said disks, together, representing the product eighty-one, or eight tens and one unit.

From the above, it will be seen that each disk contains ten equal sectors, and that the pairs of disks are arranged on their central axis in the order of the products which their sectors represent; that is, the pair which contains all the products of 1 multiplied by 0 up to 1 multiplied by 9 is first (not considering the disks, $0^a$, $0^b$); the pair containing the products of 2 multiplied by 0 up to 2 multiplied by 9 is second, and so on; the pair of disks containing the products of 9 multiplied by 0 up to 9 multiplied by 9 being ninth or last. Moreover, it is to be borne in mind that the homologous sectors of all the pairs are opposite, or, in other words, all the sectors representing the factor, 0, are in a straight line parallel to the axis of the disk-shaft; all the sectors representing the factor, 1, in a similar straight line, &c.

In order to shift the complete set of starting devices longitudinally, for a purpose hereinafter described, the main driving shaft, X, is provided with a cam-wheel, E, the cam portion of which is arranged laterally, that is, on its side, instead of on its periphery, as shown in Fig. 2. A developed view of the periphery of the cam wheel, E, is shown in Fig. 12, from which it will be seen that the wheel may be considered as divided into six equal sectors, the periphery being of equal thickness throughout the first and sixth sectors, considerably thicker in the second and third sectors, and thinnest in the fourth and fifth sectors, these various surfaces being connected by inclined surfaces, as fully shown in Figs. 11 and 12 of the drawings. The thickest portion, which determines the greatest throw of the cam, is connected with the portion in sector, I, by an inclined surface, entirely contained in the first sector. For the purpose of convenient reference hereinafter, the cam surface extending through the sectors, I and VI, will be called the mean surface, while the surface of the thickest portion, in sectors, II and III, will be called the maximum surface, and the surface of the thinnest portion, in sectors, IV and V, will be called the minimum surface.

It is to be noted, for the sake of a clear comprehension of the operation of this machine, that the mean surface extends entirely through the sixth sector and through the first sector, to within a short distance of sector, II; that the maximum surface extends from the line of division between first and second sectors, and ends at the line of division between the third and fourth sectors, and that the minimum surface begins just beyond the line of division between sectors, III and IV, and ends a short distance in advance of where the mean surface begins.

The cam-face of wheel, E, contacts with a roller, $c$, revolubly mounted on a stud, $c'$, attached to the disk-operating shaft at one end, the roller being yieldingly held in contact with the cam-wheel by the spring, $f$, whereby the cam-wheel, in one complete rotation, will force the entire set of starting devices longitudinally in one direction, and will then permit them to be drawn back by the spring, when they will be again shifted longitudinally in the primary direction to the original position. These several movements are due to the roller, $c$, riding upon the various surfaces of the cam-wheel, as will be plain from what has been said before. Upon the end of the shaft, $X^2$, opposite to that which carries the driving pinion, $u$, is loosely mounted a gear-pinion, $h$, to which is attached a dog, $q$, whose arm, $q'$, carries a tooth arranged to contact with the oppositely-projecting tooth, $p'$, of an arm, $p$, fixed to a gear-wheel, $d$, secured on the end of the disk-operating shaft, A. The two teeth, $p'$, $q'$, respectively, are of such width that they contact only when the roller, $c$, is in contact with the mean surface of the cam-wheel, E, the tooth or arm, $p$, being shifted longitudinally by the shifting of the starting devices, whereby contact between the two said teeth is avoided, either when the roller, $c$, is resting against the minimum surface, or when it is against the maximum surface of the cam-wheel, E. Into the pinion, $h$, meshes a rack, H, moving in suitable slide-ways, H', and pivotally attached to the cross-bar, Q, as shown in Fig. 4, the rack being cogged at one end only, on its upper surface, which engages the under side of the pinion, $h$. A disk-setting shaft, D, cogged at one end, and mounted in suitable slide-ways, $D^2$, engages the pinion, $d$, on the top side, the rack having a circular head, D'.

To limit the longitudinal movement of the rack, D, a key-board, $A^2$, is provided, which will be designated as the multiplier key-board, as it is on this key-board that the multiplier is generally arranged. This key-board consists of a double bank of keys, one bank having all the odd numbers, from one to nine, while the opposite bank has all the even numbers, from two to zero, the keys being arranged with the smaller numbers inward, as fully shown in Fig. 2. Each key has a stem, $A^3$, vertically movable in a socket, $A^4$, attached to the framework and provided with a head, $A^5$, the stem being held normally upward by a leaf-spring, $A^6$, passing through a slot in the stem and secured to the frame at the end, as shown in Fig. 5. When a key is pressed down, its stem will intercept the path of the head, D', on the rack, D, thereby limiting the movement of said rack, and, as the keys are numbered from the inner end of the banks outward, and, as the stems are at equal intervals apart, it is plain the distance of travel inward of the rack, D, from its normal position, will be inversely proportional to the number on the key pressed down, the digit, 0, not being considered. Thus, if key 1 is held down, the rack, D, will move the entire length of the key-board, inward, until its head strikes the stem of key 1, while, if key 9 be pushed down, the rack will only move a short distance, until it strikes the inward-protruding stem of said key 9, whereupon it will stop. Moreover, if key 0 be forced down, its stem will prevent any movement of the rack, D, whose head, D', normally rests at such a point as to be in contact with the stem of key 0, as soon as the latter is depressed.

To that end of the hollow disk-operating shaft which carries the roller, $c$, is fixed a grooved pulley, $a^2$, around which is wound a flexible wire, $f'$, fixed at one end to the pulley, and having its outer end secured to a spring, F', Fig. 2, which is attached to the frame, the tendency of the spring being to revolve the disk-operating shaft in a direction opposite to that of the pinion, $u$, when the crank handle, K, is turned to the left.

The operation of the mechanism thus far described is as follows: Upon turning the crank, K, one revolution to the left, the gear-wheel, U, is turned to the left, thereby revolving the gear-pinion, $u$, which, being one-third the diameter of the main driving gear-wheel, U, makes three revolutions to one of the crank. As the gear-pinion, $u$, is fixed to the shaft, $X^2$, the latter simultaneously operates the cranks, $w'$ and $w^2$, giving to them three complete revolutions, thereby forcing the cross-bar, Q, outward and back three times, which, in turn, imparts three reciprocations to the rack, H, whose end is pivoted to the cross-bar, Q, the movement of the rack, H, rotating the pinion, $h$, whose circumference is equal to the longitudinal throw of the rack, H, whereby the pinion, $h$, makes one full rotation during the outward movement of the rack, H, and a full rotation, in the opposite direction, during the inward movement of the rack, H, or six rotations during one of the crank, K. The cam-wheel, E, is so fixed on the main driving shaft, X, that it normally rests with the line of division between sectors, I and VI, in contact with the roller, $c$, which, therefore, is resting on the mean surface. During the first portion of the first one-sixth of a revolution of the crank, the disk-operating shaft is in such a position that the tooth, $p'$, of the arm, $p$, is in the plane of the tooth, $q'$, on the dog, $q$, the roller, $c$, at that time being on the mean surface of the cam-wheel. While the roller, $c$, is passing over the cam-surface of sector, I, the gear-pinion, $u$, makes one-half of a revolution, forcing the cross-bar, Q, outward to the full extent of its travel, and, at the same time, moving the rack, H, outward, and rotating the pinion, $h$, one full turn. The tooth, $q'$, of the dog, $q$, is in advance of the tooth, $p'$ of the arm, $p$, during this rotation of pinion, $h$, and the arm, $p$, is pulled around by means of spring, F', unwinding its flexible wire, $f'$, off the grooved pulley, $a^2$, fixed on the tubular shaft, A, the tooth, $p'$, therefore, following the tooth, $q'$, and tending to stay always in contact with the latter, which prevents the spring, F', from rapidly unwinding the wire, $f'$, from the grooved pulley, $a^2$. As the disk-shaft, A, is rotated by the spring, F', the rack-bar, D, is drawn inward by the pinion, $d$, until its head, D', contacts with the stem of any depressed key on the key-board, $A^2$, whereupon the further inward movement of the rack, D, is prevented, the said rack, in turn, holding the pinion, $d$, and the disk-shaft, A, from further rotation, against the action of spring, F', thereby retaining all the starting devices with such sectors facing inward as correspond to the key depressed on key-board, $A^2$. For instance, if key 0 is depressed, the disks will not be moved from their normal position, but will have all their zero sectors facing inward, whereas, if key 9 is depressed, the rack, D, will move inward until its head, D', contacts with the stem of key 9, and will rotate the disks, until their sectors, containing the products of 9, will face inward, that is, the rack will move one-tenth of its maximum inward movement, and will rotate the disks one-tenth of a revolution, which is one sector, the direction of this rotation being from the first sector toward the zero or last sector. While the rack, D, holds the disk-operating shaft and the arm, $p$, from following the tooth, $q'$, on dog, $q$, the latter completes its full rotation, by reason of the continued movement of the rack-bar, H, until it again reaches its normal position or starting point, at which moment, the roller, $c$, has reached the division line between sectors, I and II, on the cam wheel, and has ascended the incline leading to the maximum surface, the tooth, $p'$, on the arm, $p$, being thereby shifted, together with the entire series of starting devices, until it can no longer contact with the dog, $q$, which is rotated back over its first path, by the inward movement of the rack, H, until it again occupies its normal position, when it is again rotated in the first direction one revolution, at the end of which time the roller, $c$, has reached the division line between sectors, III and IV, on the cam-wheel, E, and has descended the incline to the minimum surface, thus shifting the starting devices and the arm, $p$, until the tooth of the latter is on the opposite side of the tooth of the dog, $q$, and still out of contact with the latter. The dog, $q$, during this time, has started back to its normal position, and, while the roller travels over the minimum surface, the said dog, $q$, reaches its normal position, and rotates back again one revolution, at the end of which time, the roller reaches the dividing line between sectors, V and VI, when it has again ascended to the mean surface of the cam-wheel, E, and has shifted the starting devices and arm, $p$, into their middle or zero position, where the teeth of the said arm, $p$, and the dog, $q$, are again in the same vertical plane. As the crank is turned to complete the revolution, the roller, $c$, travels over the zero surface of sector, VI, and the dog, $q$, rotates back to its normal position, striking the tooth of the arm, $p$, on its way, and carrying the latter back with it, thereby winding up the flexible wire on the grooved pulley, tightening the spring, moving out the rack-bar, D, and setting the starting devices to their zero or normal positions. Therefore, it will be seen that the dog, $q$, makes six revolutions, three in one direction and three in the other direction, and that during the first portion of the first and sixth revolutions, the tooth on the arm, $p$, is in the same plane with the tooth on the dog, $q$, while, during the remaining revolutions, namely, the second, third, fourth and fifth, it is in a different vertical and longitudinal plane from the said tooth on dog, $q$. Moreover, during its first revolution, it permits the spring, $F'$, to unwind the flexible wire from the grooved pulley, while, during the sixth, or last, revolution, it rewinds the wire on to the grooved pulley and thereby extends the spring, F.

The disks, $0^a$ and $0^b$, are duplicates of the disks, $I^a$ and $I^b$, Fig. 1, and have quite different functions from that of the series of starting devices, I to IX, this function being fully described in connection with the indicating mechanism.

The transmitting mechanism, which transmits the products from the starting devices to the indicating and combining mechanism, will now be described. This consists, primarily, of a series of transmitting racks, $Z^0$, $Z'$, $Z^2$, &c., up to $Z^9$, arranged in a plane parallel to the axis of the disk-shaft, and mounted in suitable guide-frames, $z$, which permit the free longitudinal movement of each rack, the rack, $Z^0$, relating to the indicating mechanism. Each rack is provided at its outer end with an arm, $z'$, which projects upward and is adapted to contact with the cross-bar, Q, as the latter moves outward, the racks being retracted by a series of springs, F, one for each rack, each spring being secured at one end to the under side of its rack and at its other end to the frame. The inner end of each rack is of a size sufficient to permit its free entrance into any recess in its respective pair of starting devices, and is cogged on its upper surface, the racks, $Z'$ to $Z^9$, being adapted to engage with any one of a series of pinions, $T'$, which may be termed the "counting pinions," for convenience of reference hereinafter. These counting pinions are each provided with a square central opening, through which is passed a square revoluble pinion-shaft, $T^2$, by which construction, each pinion may be moved longitudinally on its shaft, yet, when revolved, will impart its motion to its pinion shaft. The shafts, $T^2$, are mounted transversely over the racks, Z, in bearings, $t^2$, fixed to the frame, each shaft carrying a disk, $S^2$, at one end, each disk being provided with an eccentrically-arranged pin, $s^2$, which is arranged to enter any one of a series of eccentrically-arranged holes in a corresponding perforated disk, $S^3$, lying opposite to it, and impart motion thereto, when the said perforated disk is advanced into engagement with the pin disk. The said perforated disks, being part of the totalizing mechanism, will be more particularly described hereinafter.

Each counting pinion is provided with a grooved extension or neck, $T^3$, engaged by the lower end of a stud, $k$, sliding on a slotted plate, $K'$, as shown in Figs. 2 and 5, the shanks, $k'$, of the sliding studs projecting through the transverse slots, $k^2$, in the plate, $K'$, which is secured to the frames and bears on its upper face a series of scales, $k^3$, graduated from 1 to 9, these graduations being such that when an index or pointer, $k^4$, on the sliding stud, is aligned with any one of them, the counting pinion of such stud will be in engagement with the rack which enters the recesses in the starting devices having products of which said graduation forms one factor. For example, if any one of the sliding studs be moved longitudinally until its pointer, $k^4$, is in line with the graduation marked, say, 8, the counting pinion which is engaged by such sliding stem will be in mesh with the rack, $Z^8$, which is the rack lying opposite that pair of disks marked, $VIII^a$ and $VIII^b$ in Fig. 1, and containing recesses which give all the products of eight, from 0 multiplied by 8 to 9 multiplied by 8.

It will be noticed that each scale, $k^3$, is preceded by the figure 0, the interval between zero and 1 being much less than the distance between the succeeding digits. The normal position of each sliding stud is with its pointer opposite the zero which precedes its respective scale, in which position its counting pinion is not in engagement with any rack, and, therefore, cannot be revolved.

The rack, $Z^0$, which may be considered as a part of the indicating mechanism, engages at all times with a pinion, $r$, fixed on a short shaft which also carries a gear-wheel, $r'$, in mesh with a larger gear-wheel, $r^2$, mounted on a transverse shaft, $r^3$, which may be termed the indicator shaft, and which is provided with a pin disk, $S''$, adapted to engage with any one of a series of perforated disks, $S'$, which may be opposite to it, as will be more fully described hereinafter, the sizes of the gear-wheels, $r'$ and $r^2$, being so proportioned that, for every full revolution of the pinion, $r$, the indicator shaft, $r^3$, will make only one-half a revolution.

The end of each pinion shaft, $T^2$, as well as the end of the indicator shaft, is provided with a disk, $U'$, having ten rounded notches, as shown in Fig. 30, into any one of which notches enters the toothed end of a leaf spring, $u'$, whose other end is fixed to the frame. The springs, $u'$, and disks, $U'$, serve to compel the rotation of their respective shafts by tenths of a revolution and to hold the shafts against being accidentally rotated.

When a counting pinion is in mesh with a rack, the pinion will be rotated by any movement of such rack, it being obvious that the amount of rotation and its direction will be determined by the amount and direction of longitudinal movement of the rack. As one rotation of the crank, K, imparts three reciprocations to the cross-bar, Q, the racks will also be drawn outward three times, by means of their upward-turned outer ends being engaged by the cross-bar, and they will be retracted three times by their respective springs. The ends of the racks normally rest between the units and tens disks of each pair, that is, the rack, $Z^6$, for example, will have its end normally resting between the disk $VI^a$ and $VI^b$, the hand crank being in its normal position and the roller, $c$, on the division line between the sectors, VI and I, of the cam-wheel, E. When the racks are moved to their outward limit by the cross-bar, Q, the roller, $c$, will ride up the incline at the end of sector, I, and thereby shift the starting devices laterally such a distance as to bring the tens disks opposite the ends of the racks. At the end of this time, the racks will be drawn back by their respective springs, their upturned ends following, and in close contact with, the cross-bar, Q, while their other ends enter the recesses in the tens disks of the starting devices, until the ends of the racks rest on the bottom of the respective recesses, when their further retraction by their springs is prevented, and they can no longer follow the cross-bar inward. The next outward movement of the cross-bar again draws the racks out, entirely withdrawing their ends from the recesses in the starting devices, and, at the end of the movement, a second shifting of the starting devices takes place, in a direction opposite to the first, owing to the roller, $c$, riding down the cam surfaces onto the minimum surface, which brings the units disks, or all the disks $b$, in line with their respective racks. The racks will again be drawn inward by their springs and will enter the recesses in their respective units disks. At the final outward movement of the cross-bar, the racks are withdrawn from the recesses in the units disks, and the starting devices are again shifted longitudinally in the first direction, by the roller, $c$, riding onto the mean surface of the cam-wheel, E, thus bringing the starting devices to their normal position, after which the racks, return to their normal position, by the action of their springs, and rest with their inner ends between the units and tens disks of their respective pair, in which position, they are shown in Fig. 2, the crank arriving again at its starting point, while the roller, $c$, also reaches its normal position. As the depth of the recesses in the disks varies according to the products to be represented, so the inward movement of the racks will vary, and, it is plain, that, so also, the second and third outward movements of the racks will vary, for those racks whose ends have entered the deepest recesses in their respective disks will, of course, be started to move sooner than the others, that is, they will come first into engagement with the cross-bar, Q, while those racks which entered the shallower recesses in their respective disks will be last to engage with the cross-bar on its second and third outward movement, thereby being the last to start. Therefore, the racks first engaged by the cross-bar will have the greatest longitudinal movement during such second outward movement of the cross-bar. So, also, the rotation of the counting pinions, $T'$, will vary during the first and second inward movement or the second and third outward movement of the racks. For example, if the rack, $Z'$, were opposite the recess marked 1, in the disk, $I^b$, Fig. 1, on its second inward or third outward movement, it would go exactly one-ninth the distance that it would if opposite the recess marked 9, in the same disk.

It is to be understood that, when a rack is opposite an unrecessed sector of a disk, it has no appreciable first or second inward movement, but rests against the periphery of such disk, and, of course, can have no outward movement, except the initial drawing out.

It will be seen that the rack marked $Z^0$, is adapted to contact with the pair of disks, $O^a$, $O^b$, these disks in every respect resembling the disks, $I^a$, $I^b$, shown in Fig. 1. When the rack, $Z^0$, is opposite the units disk, $O^b$, it has an inward movement corresponding to the depth of recess in the sector opposite it, and the said depths correspond to the numbers on the key-board, $A^2$. Thus, if the key 1 be depressed, the sector on disk, $O^b$, containing the recess of a depth equal to one graduation, will come opposite the rack, $Z^0$, at the second inward movement of said rack, while, if the key 9 be depressed, the sector containing the recess whose depth is equal to nine graduations will be placed opposite said rack at its said second inward movement. Therefore, the distance of travel of the rack, $Z^0$, during its second inward movement, is proportional to the number on the key depressed, and, consequently, the distance of travel of said rack during its third outward movement is also proportional to such number.

To clearly illustrate the operation of all the mechanism thus far described, the following example will be given: Suppose it is desired to multiply 509 by 28. The multiplicand, containing the greatest number of digits, is preferably arranged on the multiplicand keyboard, $A'$, as it may be termed, in the following manner: The first or left-hand sliding stud, $k$, (Fig. 2,) is moved downward until its pointer is opposite the figure, 5, thereby engaging its counting pinion with the rack, $Z^5$.

The next sliding stud, $k$, to the right is not moved, since its pointer is normally opposite the figure, 0, which is the second figure in the multiplicand; and, finally, the third sliding stud, $k$, is moved downward until its pointer is in line with the digit, 9, on its scale, thereby engaging its counting pinion with the rack, $Z^9$. This completes the setting of the multiplicand on the machine. The multiplier key, 2, on the key-board, $A^2$, is then depressed and held down so that its stem will intercept the head, $D'$, of the rack, D, whereupon the crank, K, is turned one complete revolution. As the rack, D, is stopped as soon as its head strikes the stem of key, 2, the starting devices are all held with their sectors containing the products of key 2 facing inward toward the ends of the racks, which first enter the recesses in the tens disks and then in the units disks at the appropriate time. At the time the racks make their first inward movement, the starting devices are shifted with their tens disks, $a$, opposite the ends of the racks, and, as the second sector in the tens disk, $V^a$, (counting to the left,) is recessed one graduation, the rack, $Z^5$, will move inward equal to one graduation, until its inner end contacts with the bottom of the recess in the second sector of such disk, $V^a$, while the second sector of the tens disk, $IX^a$, being recessed one graduation also, the rack, $Z^8$, will move inward one graduation. The first counting pinion being in mesh with the rack, $Z^6$, will be rotated first in one direction and then in the other direction an extent corresponding to one graduation, both by the first inward and by the second outward movement of the racks, thereby rotating its pinion shaft an equal amount in both directions. The second counting pinion, not being in engagement with any rack, will remain stationary, while the third counting pinion, being in mesh with the rack, $Z^9$, will be rotated a distance equal to one graduation, and its pinion shaft also. The rack, $Z^0$, will not be moved during the first inward or second outward movement of the cross-bar, Q, as its inner end abuts against the periphery of the disk, $O^a$, which, as before stated, is not recessed. Therefore, the pinion, $r$, and gear-wheel, $r^2$, will be stationary. Hence, only two pinion shafts revolve at the time of the second outward or first inward movement of the cross-bar, Q, namely, the first and third pinion shafts, the second pinion shaft being stationary. Before the racks start on their second inward movement, the starting mechanism is shifted so as to bring its units disks opposite the ends of the racks, which then enter the recesses in said disks, or abut against the peripheries of those disks having zero recesses, that is, having no recesses in the sectors opposite the racks. The rack, $Z^9$, will enter the recess in the second sector of the disk, $IX^b$, which recess is eight graduations in depth, thereby permitting the rack, $Z^9$, to move inward eight graduations. The rack, $Z^5$, will not enter the second sector of the disk, $V^b$, since that is not recessed, and, of course, the rack, $Z^5$, will be stationary, not only during its second inward movement, but also during its third outward movement. The rack, $Z^0$, being opposite its units disk, will enter the second recess, which is two graduations in depth, and will thereby move longitudinally a distance equal to two graduations, thus rotating its pinion, $r$, equal to two graduations, which revolves the gear-wheels, $r'$ and $r^2$, the latter moving one-half the portion of a revolution made by the pinion, $r$. The second pinion shaft, not being in engagement with any rack, will not be moved. It will be plain, therefore, that the third counting pinion will revolve a distance equal to eight graduations, while the first and second factor pinions are stationary. Thus, it will be seen that, by one rotation of the crank, I obtain two series of variable movements of the pinion shafts, one due to the entrance of the racks into the tens disks, and the other due to the entrance of the racks into the units disks. The first series may be termed the "primary revolution," and the other the "secondary revolution." In this particular example, I obtain a primary rotation of the first and third pinion shafts equal to one graduation each, or one tenth of a revolution, and I then obtain a secondary revolution of the third pinion shaft, only, equal to eight graduations or eight-tenths of a revolution. These results may be expressed as follows: Where 1, 2 and 3 indicate the first, second and third shafts, "P" designates portions of a primary revolution and "S" designates portions of a secondary revolution, the shafts being mentioned in the order of their places on the machine from right to left.

| 1 | | 2 | | 3 | |
|---|---|---|---|---|---|
| P | S | P | S | P | S |
| 1 | 0 | 0 | 0 | 1 | 8 |

The above indicates that, by multiplying 509 by 2, I obtain from the product of the third digit 9 by 2 equals 18, that is, one ten and eight units. From the multiplication of the second digit, 0 by 2, I obtain no tens and no units, while from the multiplication of the first digit, I get the number, 10, or one ten and no units. It will be plain, then, that one secondary revolution of the second shaft is equal, in value, to one primary revolution of the third shaft, while a secondary revolution of the first shaft is equal to one primary revolution of the second shaft, and this is true for all the shafts. This being so, I can tabulate the above figures in this way:

| 1 | 2 | 3 | |
|---|---|---|---|
| P | S | S | S |
| 1 | 0 | 1 | 8 | that is, all the portions of a primary revolution of the third shaft are considered as portions of a secondary revolution of the second shaft, and all the portions of a primary revolution of the second shaft are considered as portions of a secondary revolution of the first shaft, and have been so represented above. Therefore, the above figures show that the product of 509 by 2 is 1,018, which is correct.

It will be seen hereinafter that it is the function of the totalizing or combining and registering mechanism to reduce the secondary revolution of one shaft to primary revolutions of the next shaft ahead or to the left of it. When the crank has completed its revolution which produced the above results, the key 2 is allowed to spring back to its normal position, the whole mechanism thus far described being again at zero, or in its normal position. The key 8, of the key-board, $A^2$, is then depressed and held down while the crank is turned, the operation being easily understood from what has been said before. In this case, I obtain a primary revolution of the third shaft, equal to seven graduations, no primary revolutions of the second shaft, and a primary revolution of the first shaft, equal to four graduations. The secondary revolution of the third shaft is equal to two unitary graduations. That of the second shaft is zero, while that of the first is zero also. This may be tabulated as follows:

| 1 | | 2 | | 3 | |
|---|---|---|---|---|---|
| P | S | P | S | P | S |
| 4 | 0 | 0 | 0 | 7 | 2 | or, replacing the primary revolutions by their equivalent secondary revolutions, I have

| 1 | | 2 | 3 |
|---|---|---|---|
| P | S | S | S |
| 4 | 0 | 7 | 2 | which shows that 509 multiplied by 8 equals 4,072, which is correct; but, it is clear that, in the first multiplication, the multiplier, 2, represented two tens, while, in the second multiplication, the multiplier, 8, represented eight units. Therefore, the first product, 1,018, was one thousand and eighteen tens, or 10,180, while the second product, of course, is correct as it stands, that is, four thousand and seventy-two units. Combining these, I get 14,252, which is the total product of 509 by 28.

The mechanism which gives to each key depressed on the key-board, $A^2$, its proper value, whether units, tens, hundreds, &c., is contained in the totalizing or combining and registering mechanism, which will now be described. It consists, primarily, of a series of perforated disks, $S^3$, each disk having ten pin-holes arranged in a circle, at equal distances apart, all the disks being mounted on a register carriage adapted to move transversely so as to throw the perforated disks into engagement with the pin-disks on the pinion shafts immediately preceding the movement when the cross-bar, Q, has completed its first inward movement. The register carriage moves back, withdrawing the perforated disks from the pin-disks, at the moment the cross-bar has completed its second outward movement, and shifts longitudinally, so that each perforated disk is moved opposite the pin-disk of the next shaft to the left of the one with which it was in contact before—that is, the perforated disk in contact with the pin-disk on pinion shaft No. 2 is moved until opposite the pin-disk on pinion shaft No. 1, and so on. Just as the cross-bar is completing its second inward movement, the register carriage again moves transversely, so as to throw the perforated disks and the pin-disks in contact, removing them from such contact as the cross-bar completes its last outward movement. The perforated disks are mounted on spindles which carry dials that serve to indicate the rotations, or parts of a rotation, made by their respective spindles. To produce these movements, the following mechanism is employed: A cam-operating shaft, $X'$, is journaled in the framework of the machine at $x'$, and provided at one end with a bevel gear-wheel, $W'$, which meshes into a corresponding bevel gear-wheel, W, fixed on the main driving shaft, X, whereby motion is transmitted to the cam-operating shaft, by the revolution of the crank, K. The shaft, $X'$, carries a pair of cam-wheels, $E'$ and $E^2$, one at each end of the shaft, such cam-wheel being fixed on the shaft and having similar peripheral cam-surfaces, best shown in Fig. 13. The cam-wheel, $E^2$, also has a lateral cam-surface, V, $V'$, as shown in developed view in Fig. 14, and is cogged internally, as shown in Fig. 2, for engagement with a gear pinion, $v$, fixed on a square shaft, $Y'$, carrying a cylinder, Y, longitudinally movable on the said shaft, which is journaled in suitable bearings in the frame, as at $v^2$, Fig. 2. The part of the frame carrying said bearings, $v^2$, is provided on its upper surface with inverted V-shaped tracks on which move correspondingly grooved wheels, $R'$, $R^2$, $R^3$, and $R^4$, carrying end-pieces, $B^2$, which are united by guide-rods, J, as shown, the guide-rods and end-pieces, together, forming what will be termed the "main carriage," the end-pieces having slots, $b$, through which the cam-operating shaft passes, whereby the movement of the main carriage toward or from the transmitting mechanism is permitted, this movement being caused by the cam-wheels, $E'$, $E^2$, whose peripheral cam-surfaces act on rollers, $e$, carried on bracket arms, $e'$, attached to the end-pieces, $B^2$, the main carriage being held with the rollers, $e$, in contact with the cam-wheels, $E'$, $E^2$, by means of springs, $e^2$, Fig. 15, secured to the end-pieces and to any suitable portion of the framework. On the guide-rods, J, is mounted an upper auxiliary carriage composed of end-pieces, $B^4$, Fig. 17, which are longitudinally movable on the guide-rods and are united by two pairs of bearing bars, $b'$, $b^2$, the upper pair, $b'$, carrying a series of indicator spindles, $s$, on each of which is fixed a perforated disk, $S'$, an indicating-dial, C, and a mutilated upper star-wheel N, which will be more fully described hereinafter. In the lower pair of bearing bars, $b^2$, are revolubly mounted a series of register spindles, $s'$, each of which is provided with a perforated disk, $S^3$, a lower mutilated star-wheel, $n$, hereinafter referred to, a finger, P, a register dial, $a'$, and a ten toothed star-wheel, $n'$. Beneath the upper auxiliary carriage is a lower auxiliary carriage, composed of end-pieces, $B^3$, united by a pair of bearing bars, $b^3$, the end-pieces, $B^3$, being arranged below and within the end-pieces, $B^4$. The end-pieces, $B^3$, slide longitudinally on guide-rods, $J'$, which are united at each end by a truck, $B^5$, Fig. 15, provided with wheels, $b^4$, running on a flat track, $b^5$, and forming part of the frame which has the V-shaped track. The two auxiliary carriages, together with the main carriage, I term the "recording carriage." In order that the auxiliary carriages may both be shifted longitudinally together, the end-pieces, $B^3$, of the lower auxiliary carriage are extended in height above the lower edges of the end-pieces, $B^4$, of the upper auxiliary carriage. The springs, attached to the end-pieces, $B^2$, of the main carriage, tend to hold the auxiliary carriages forward, that is, with the perforated disks in contact with the pin-disks, the action of the springs on the upper auxiliary carriage being transmitted to the lower auxiliary carriage, by means of tongues, $b^6$, one tongue being attached to each end-piece, $B^2$, of the main carriage and entering a notch, $b^7$, in the upper edge of the corresponding truck, $B^5$, the length of the notches being such that the trucks, and hence the lower auxiliary carriage, are permitted a limited movement independent of the main carriage and the upper auxiliary carriages. The trucks, $B^5$, are guided on their flat tracks by means of guide-pins, $b^8$, fixed to each end of each truck, the forward guide-pins working in slide-ways in the upper end of bracket-arms, $b^9$, fixed to the framework, while the rear guide-pins move in holes bored in the edge of the frame, which is thickened for this purpose, as at $b^{10}$. In the bearing bars of the lower auxiliary carriage is mounted a series of dog-spindles, $M'$, each provided with a finger, $m'$, arranged to be engaged by the finger, P, of the spindle one placed to the right of the spindle directly over it. Each finger is provided with an arm, $P'$, which is sector-shaped, as shown in Fig. 18, the periphery of each sector having five notches, one at the center and two at each side of the center. A leaf-spring, $P^2$, secured to the frame has its free end bent to form a tooth, $p^2$, which is arranged to enter any one of the notches in its respective sector-arm, thereby preventing any accidental movement of the finger or of the dog-spindle, the spring-tooth engaging the central notch in the normal position of the dog-spindle, and engaging the other notches, according to the direction in which the dog-spindle is rotated, and the amount of such rotation. This will be better understood when taken in connection with the operation of the dog-spindles, and their attached parts, which will be described hereinafter. On the rear or outer end of each dog-spindle is fixed a carrying dog, $t'$, of the shape shown in Fig. 10, each having a downward-extending arm provided with a pin, $i$, and having two teeth, $i^2$, arranged to engage the teeth of the star-wheel, $n'$, directly above it.

The cylinder, Y, is provided with two sets of projections, one set consisting of a series of spirally-arranged cam-teeth, $y$, the inclined surface of one tooth of each pair being sloped in a direction opposite to that of the other and the teeth of each pair being so located, as to leave a passage between them. The second set of projections is arranged in a straight longitudinal row and consists of a series of doubly-wedge-shaped cam teeth, $j$, arranged a short distance apart, so as to leave a passage between them, these passages being in line with the passages between the individual teeth of each pair of projections, $i$. This construction will be fully understood from Fig. 9, which is a developed view of the cylinder, Y. When the spindles of the register dials are rotated one cycle, their fingers contact with the fingers of the dog-spindles to the left of the one below the respective fingers, whereby the carrying dogs are swung in one direction or the other, according to the direction of rotation of the recording spindles. The cylinder is so located that, as it revolves, the pin, $i$, of the carrying dogs, will enter the passages between the spirally-arranged cam-teeth, when the said dogs are in their normal position, that is, when in a vertical position, as shown at 1, Fig. 10. When, however, the dogs are swung in either direction, their pins, $i$, will contact with the inclined surface of one or the other tooth of their respective pair, according to the direction in which the dogs have been swung, whether to the right or to the left. As soon as the pins contact with the inclined surfaces of the teeth, the cylinder, by its rotation, will force the dogs farther over in the direction in which they were started by the fingers, whereby one or the other of the teeth, $i^2$, are engaged with their respective star-wheels, $n'$, and rotate the latter one tooth in one direction or the other.

It will be apparent from the above that whenever a register dial is revolved one complete turn in either direction, it moves the adjacent register dial at the left one-tenth of a revolution. Therefore, when a pinion shaft on the transmitting mechanism is caused to make less than a full revolution, the register dial with which it is coupled will also make less than a complete revolution, and, as the said register dial bears a graduated series of ten figures, on its periphery, running from 0 to 9, the said register dial will indicate the parts of a full revolution made by the pinion shaft, and, when a pinion shaft makes one complete revolution, it will also rotate its register dial one complete cycle, which, if said register dial be initially at zero, will be from zero to zero again, whereby the said register dial will move the adjacent register dial on the left one-tenth of a revolution in a corresponding direction, which will be from 0 to 1 or from 0 to 9 (if the said adjacent register dial be initially at 0), according to the direction of such rotation. As the cylinder continues to revolve, the pins of those dogs which have been swung to one side will be brought into contact with one or the other inclined surface of the wedge-shaped teeth, $j$, whereby the dogs will be restored to their normal positions. It will be plain that when the dogs are swung back to their said normal positions by the teeth, $j$, their respective star-wheels, would also be rotated in a direction opposite to that previously given them, if the dogs were still in engagement with them. To prevent this, the upper auxiliary carriage is moved toward the transmitting mechanism, whereby the star-wheels are also carried forward out of engagement with the dogs, which, being mounted only on the lower auxiliary carriage, do not partake of the motion of the upper auxiliary carriage, until their pins are out of engagement with the teeth on the cylinder, Y.

The teeth, $y$, on the cylinder, Y, are arranged spirally for the reason that, by this construction, the dogs are swung one at a time, commencing at the right and ending at the left, thus not only reducing the power necessary to rotate the cylinder, but also permitting the carrying dogs to carry a ten throughout an entire series of figures. For example, if the register dials show the number, say, 999,999, and the number 1 be received from the transmitting mechanism to be added to the above number, this 1 will be added to the first 9 at the right, by the rotation of the dial containing such 9, the rotation being due to the rotation of the pinion shaft coupled to such dial. When the said 1 has been thus added to the figure 9 on the said dial, the latter will, of course, be brought to zero, and the finger, P, on the first dog-spindle to the left will be swung to one side, whereupon that pair of cam-teeth, $y$, on the cylinder, Y, which is arranged to contact with the pin of such dog, will move the latter so as to turn its dial one-tenth of a revolution, which will be from 9 to 0, at the same time swinging the next dog at the left, which is thus engaged by its respective pair of cam-teeth, $y$, and moves its dial from 9 to 0, which swings the next carrying dog at the left, which is then engaged by its cam teeth, and so on, until the dial containing the first left hand 9 is reached, whereupon this dial will also be set at zero and the adjacent dial to the left will be set at 1, the dials then showing the number, 1,000,000. This operation, I designate as "carrying the tens."

If the teeth, $y$, on the cylinder, were in a straight row similar to the teeth, $j$, the above operation, of course, could not be performed, as all the teeth, $y$, would simultaneously come opposite the pins of their respective dogs, and the latter, with the exception of the first one at the right, would enter the passages between their teeth before being swung to one side by the fingers on the adjacent right hand spindles.

The lateral movement of the carriages, independent of each other, is due to the tongues which project down from the end-pieces of the main carriage, and enter the notches in the trucks, as before described.

The springs which are attached to the main carriage pull the main carriage and the upper auxiliary carriage forward, as soon as permitted by the rollers moving onto the inner cam-surfaces of the cam-wheels, $E'$, $E^2$, and, as soon as the tongues have reached the forward ends of their respective notches, they draw the lower auxiliary carriage forward until the pins of the carrying dogs are freed from their position of contact with the projections on the cylinder, Y. The continued forward movement of the carriages brings the perforated disks in contact with the opposite pin-disks.

In order to permit the fingers, P, of the register spindles, to stay in contacting position with regard to the fingers of the carrying dog spindles, the latter fingers are made wide enough so as to allow the shifting of the upper carriage relative to the lower to take place, and, to prevent the lower auxiliary carriage from following the upper auxiliary carriage during the beginning of its inward or forward movement, the trucks are each provided, on their under side, with two notches, $b^{11}$, Fig. 15, whose distance apart is equal to the independent movement of the upper carriage, a spring, $b^{12}$, being attached to the frame below each truck, and entering one or the other notch in the lower edge of its respective truck, whereby the lower auxiliary carriage is held backward or forward until the fingers of the upper auxiliary carriage actually reach the ends of their notches.

For the purpose of shifting the two auxiliary carriages longitudinally on the main-carriage guide-rods, J, the lower edge of the lower auxiliary carriage is provided with a comb, $v'$, Fig. 7, pivoted at one end to a projection secured to one of the end-pieces of the lower auxiliary carriage and arranged to be raised or lowered at the other end by means of a rod, $K^2$, movable in lugs secured to one end-piece of the upper auxiliary carriage.

The comb, $v'$, is provided with teeth, $v^7$, arranged at intervals equal to the distance from center to center of the register spindles, the teeth being arranged to be severally engaged by a nose, $v^5$, fixed on the upper face of a reciprocating shifting bar, $v^2$, mounted at one end in a slide-way, $G'$, and in a slide-way formed at G, in the framework carrying the truck. The outer end of the bar carries a roller which is held in contact with the lateral cam-surface, V, V', of cam-wheel, E², by a spring, $v^6$, as will be fully understood from Fig. 7. On the inner end of the shifting bar, $v^2$, is mounted a sleeve, $v^3$, having a projecting collar, $v^3$, through which is passed a long screw, $v^4$, having one end threaded a short distance into the slide-way, G'. The sleeve fits snugly enough on the shifting rod to be moved with the movement of the latter in either direction, until limited either by its collar contacting with the slide-way, G', or by engaging the head of the screw, $v^4$. As the shifting bar is forced inward by the projection, V', on the cam-wheel, E², the nose, $v^5$, comes in contact with one tooth of the comb, $v'$, and forces the said comb inward one tooth, at the same time, carrying with it the lower auxiliary carriage, which also moves the upper auxiliary carriage, owing to the fact that the bearing bars of the lower auxiliary carriage extend upward between the end-pieces of the upper auxiliary carriage.

The cylinder, Y, is provided with a grooved neck, $y'$, which is engaged by the forked end of an arm, M, projecting from the lower auxiliary carriage, whereby the cylinder will move longitudinally on its square shaft by the longitudinal shifting of the carriages.

The cam-wheel, E², is so fixed on the cam-operating shaft that the roller on the end of the shifting bar, $v^2$, begins to ascend the incline on the protruding cam-surface, V', of wheel E², at the moment when the racks, Z⁰ to Z⁹, commence their second inward movement, when the units disks are opposite the ends of the racks, and the roller commences to descend the decline of said protruding cam-surface, V', at the time when the said racks begin their third and last outward movement. Moreover, the carriages are shifted laterally toward the pin-disks, by means of the peripheral cam-surfaces on wheels, E' and E², at the moment when the shifting bar has reached the limit of its inward movement, whereby the teeth on the comb, $v'$, are moved out of the position of engagement with the nose on the shifting bar and the latter is then free to return by the action of its spring, without contacting with the comb. When the comb is moved longitudinally inward, the tooth preceding the one which is engaged by the nose, $v^5$, will strike against the collar, $v^3$, and will force the latter along until it strikes the slide-way, G', whereupon the further motion of both the comb and collar will be stopped. As the shifting rod is retracted by its spring, $v^6$, the sleeve will move outward with the rod, by friction, until it is stopped by the head on the screw, $v^4$, whereupon it is ready to enter the space behind the next tooth on the comb, when the latter has been shifted by the movement of the carriages.

For the purpose of setting the indicator and the register dials at zero, the following mechanism is employed: The mutilated star-wheels, N and $n$, on the indicator and the register spindles of both said dials contain but nine teeth, the tenth tooth being removed, which leaves a gap or space, the mutilated star-wheels on the spindles of the indicator dials being so arranged that, when the said indicator dials are at zero, the gaps will be on the lower sides of the star-wheels, while the star-wheels on the spindles of the register dials are arranged exactly opposite, that is, their gaps are on the upper side, when their register dials are at zero. Between the two sets of star wheels is located a revoluble shaft, N', mounted in bearings in the main frame, and may be turned by hand. On this shaft are fixed three racks, N², N³, and N⁴, extending the full length of the machine, two of the racks, N² and N³, being diametrically opposite, while the third, N⁴, is half way between the said two racks. When the shaft, N', is turned with the two diametrically-opposed racks in a vertical position, the teeth of the racks will engage the teeth of the star-wheels, and, as the carriage is drawn backward, the star-wheels will be revolved until their gaps come opposite the racks, whereupon they cannot be rotated farther, and will remain at zero, the indicator and register dials, of course, being also at zero. The third rack, N⁴, may be turned so as to engage either the upper or lower set of star-wheels, which can thus be returned to their normal position independent of each other.

The indicator dials, C, hereinbefore mentioned, are provided with two series of peripheral figures, each series running from 0 to 9, in a direction opposite to that of the other, and extending only half way around the periphery—that is, each indicator dial has its periphery divived into twenty parts, which are numbered from 0 to 9, and then from 9 to 0, the two 9's being separated by the figure, 0, as shown in Fig. 7. The perforated disks, S', are arranged to severally engage the pin-disk, S'', on the indicator shaft, $r^3$, Fig. 5, whereby any movement of the latter will be indicated on the register dial, C, at that time connected to the register shaft.

The cam-wheels, E' and E², are fixed on the cam-operating shaft, but the bevel gear-wheel, W', is loose thereon, and, to connect the latter so that it may revolve the cam-operating shaft, the cam, E', is provided with a spring-bolt, $m$, Fig. 3, which is adapted to enter either of two holes in a segment, W², fixed to the bevel-wheel, W', these holes being sixty degrees apart, that is, one sixth of a rotation from each other. When the spring-bolt is in one hole, the cam-wheels, E' and E², will force the carriages into connection with the transferring mechanism, at the moment when the racks, Z' to Z⁹, are beginning their second and third outward movements, whereby the register dials will be rotated by the outward movement of the racks, and will turn in a sinistral direction, whereas, if the bolt be in the other hole in the segment, W², the cam-wheels will move the carriages forward one sixth of a revolution sooner than before and the register dials will be rotated during the first and second inward movements of the racks.

From what has been stated of the various parts of the apparatus, it will be plain that the complete operation may be considered as divided into six equal portions of a revolution of the hand-crank. These operations, however, are modified according to whether the machine is set for multiplication or division.

When set for multiplication, the following are the six steps which occur during one rotation of the crank:

First, the outward movement of the racks, $Z^0$ to $Z^9$, by means of the cross-bar, Q, the simultaneously turning of the starting mechanism, until those sectors which contain the products of the depressed key are opposite the end of the racks, and the lateral shafting of the starting mechanism until the tens disks are opposite the ends of the racks.

Second, the inward movement of the racks, $Z^0$ to $Z^9$. At the completion of the second sixth of the revolution of the crank, the racks rest with their inner ends abutting either against the bottom of the recesses, or against the periphery of the unrecessed sectors. As the racks reach the end of their first inward movement, the totalizing or combining and registering mechanism is forced forward until its perforated disks are coupled with the pin-disks.

Third, the second outward movement of the racks, which rotates the pinion shafts, and thereby moves the register dials, which are coupled to the pinion shafts, and indicates the revolutions or portions thereof made by the counting pinions, the indicator dials remaining stationary. As the racks reach the limit of their outward movement, the totalizing mechanism is drawn backward so that its perforated disks are no longer in contact with the pin-disks, and the starting mechanism is again shifted until its units disks are opposite the ends of the racks.

Fourth, the second inward movement of the racks, whose ends then enter the recesses in the units disks, or abut against the peripheries of those sectors which have no recesses. During this time, the carrying pins of the transferring dogs have been in their position of engagement with the projections on the cylinder, Y, and any carrying dogs out of their normal position will be forced farther to the left, by the left hand inclined surfaces of the spirally-arranged teeth, $y$. Toward the close of this sixth of a revolution, the inclined carrying dogs are restored to their normal position, by their pins coming into contact with the right hand inclined surfaces of their respective teeth in the straight row of teeth, $j$, and, as soon as this is done, the whole totalizing mechanism is moved laterally one place to the left, and is simultaneously moved forward again into engagement with the transmitting mechanism, each perforated disk being now coupled with that pin disk which lies one place to the left of the one with which it previously engaged.

Fifth, the third outward movement of the racks, thereby turning the dials according to the depth of the recesses in the sectors of the starting devices, the register dials indicating the rotation of the pinions, while the indicating dial in engagement with the register shaft is rotated so as to indicate a number equal to the number on the depressed key on key-board, $A^2$. Toward the end of this movement, the register mechanism is forced backward out of engagement with the transmitting mechanism, and the starting mechanism is shifted to its normal position.

Sixth, the final inward movement of racks to their normal position, and the rotation of the starting mechanism to its normal or zero position, during which time the carrying dogs which may have been thrown out of their normal position, are swung still farther by the teeth on the cylinder, Y, to operate their respective star-wheels, and then are thrown back or restored to their normal position again.

In division, the steps are similar to the above, with the exception that the totalizing mechanism is coupled with the transmitting mechanism during the first and third sixths of the rotation of the crank, whereby the dials are rotated by the inward movement of the racks instead of by the outward movement, so that the figures appear on their peripheries in decreasing series and the carrying dogs are swung in a direction opposite to that which they have in multiplication, and hence the dials to the left of those which make one revolution are rotated backward by the carrying dogs.

In using the machine for division, the spring-bolt, which locks the bevel wheel, W′, to the cam-wheel, E′, is first set in its position for multiplication, and the dividend then arranged on what has been previously termed the "multiplicand key-board," A′, whereupon it is transferred to the register dials by multiplying it by unity, that is to say, the key 1, on key-board, $A^2$, is depressed, while the crank, K, is turned one revolution. The divisor is then arranged on the said multiplicand key-board, A′, and the machine set in its position for division, or, in other words, the spring-bolt is shifted to the other hole of the segment carried by the wheel, W′. The carriages are shifted longitudinally so that the spindle carrying the register dial which bears the left hand figure of the dividend is coupled to the pinion shaft whose pinion represents the second left hand figure of the divisor. The operator mentally determines the number of times the divisor is contained in the first figures of the dividend, and presses such key as bears the number equal to the trial quotient thus obtained, at the same time turning the crank, which causes the mechanism to subtract the product of the divisor multiplied by the number on the key depressed from the original dividend, the difference remaining on the register dials after the operation, being then used as a second dividend and the operation carried out as before, until the final difference, remaining on the register dials, is less than the divisor. The number expressed on the indicator dials is the quotient.

The operation of the machine in performing addition is similar to that in multiplication, with the exception that the recording carriage is not moved longitudinally, the comb, $v'$, being raised so as not to engage the nose on the shifting bar.

The operation in subtraction is similar to that in addition, with the exception that the spring-bolt, $m$, is placed in the position it occupies when the machine is used for division.

In Figs. 19 to 25, I have shown another form of mechanism embodying my invention, which may be considered under four divisions, namely: first, the controlling mechanism; second, the transmitting mechanism; third, the totalizing mechanism, which, for the sake of perspicuity, in this instance, may be described first; fourth, the indicating mechanism, which need not be described or shown herein, as its construction and operation will be clear from the description of the indicating mechanism, described in the first machine, when taken in consideration with the description of the three other divisions of the present machine.

The transmitting mechanism consists of racks, $Z'$ to $Z^9$, constructed as in the first form of mechanism embodying my invention, and arranged to engage a series of counting pinions $T'$. The cross-bar, Q, is connected to side rails, $Q^7$, which are reciprocated by a connecting rod actuated by a crank, $w'$, mounted on the main driving shaft, X, which, in this case, is at the same end of the machine as the cross-bar, Q. The counting pinions are mounted on pinion shafts, each being provided with a pair of oppositely-beveled gear-wheels, $S^7$, which are fixed on a sleeve, $S^8$, having a square central opening through which the pinion shafts pass, the latter also being squared. By this construction, the longitudinal movement of each sleeve is permitted, while, at the same time, the rotary motion of each pinion shaft will turn its sleeve and the gear-wheels also. The sleeves are united in any suitable manner to a longitudinal bar, $S^9$, moving transversely in slide-ways, $S^{10}$, each end of the bar being provided with a contact rod, $S^{11}$, the contact rods being arranged to engage with cams, $E^7$, which are adjustably fixed on the cam-operating shaft, $X'$, in such a manner that the bevel-gears and the sleeve may be shifted in either direction, as desired, as will be more clearly explained hereinafter.

In the present machine, the register spindles are arranged vertically, instead of horizontally and are provided at their lower ends with bevel gear-wheels, $S^{12}$, each bevel-wheel being adapted to engage one or the other of its respective bevel gear-wheels, $S^7$, fixed on the sleeve. The direction of rotation of each spindle depends upon which bevel wheel of the pair, $S^7$, its own bevel-wheel engages, and, when not in engagement with either, it remains stationary.

The controlling mechanism consists of a series of transverse combs, $R^7$, journaled in the side bars, $Q^7$, and adapted to be shifted in the direction of their lengths, by means of a grooved rail, $R^8$, fixed to the sliding rods, $R^9$, moving in slide-ways, $R^{10}$, the end of each sliding rod being pressed into contact with a cam-wheel, $E^8$, fixed on the cam-operating shaft, by means of a spring, $f$, the rotation of the said cam-operating shaft thereby shifting the combs in one direction or the other. To one end of each comb, $R^7$, is fixed a fork consisting of an upper arm, $R^{11}$, and a lower arm, $R^{12}$, a pin, $A^8$, fixed on a stem, $A^3$, working between these arms of the fork, each stem moving vertically in a pair of sockets, and provided with a head on which is marked the key number. For the purpose of holding each key in its normal position, a helical spring is provided, each spring surrounding the stem of its respective key, and bearing against a collar, $A^9$, passed through the stem, the lower ends of the springs resting on the lower sockets, $A^4$. The sockets are fixed to the framework carrying the slides in which the racks are mounted, in such a manner that, when the side rods, $Q^7$, are in their normal position, at the end of their inward movement, the pin, $A^8$, on each key-stem, $A^3$, will be between the arms, $R^{11}$, $R^{12}$, of the fork on its respective comb, and, therefore, when in this position, if a key be depressed, its pin will strike the lower arm and swing it downward, thereby rotating the comb on its axis, whereby the teeth of the comb are moved until they point upward. To the under side of the racks are attached two series of pins, which, as they determine the point at which the racks start in multiplication, may be termed "stopping pins," and, moreover, one series of the pins may be termed the "tens pins," and the other, the "units pins," the former being shown by the small blackened squares in Fig. 27, while the latter are represented by the small unshaded squares. The pins are so fixed on the racks that, when any comb, $R^7$, is turned with its teeth projecting upward, when the main driving shaft is revolved and the side rods thereby moved outward, the said comb will engage the tens pins of its respective set, and will carry the racks outward with it, the racks being retracted during the inward movement of the combs by their respective springs. When the comb reaches its limit of inward movement, it is shifted in the direction of its length and again moved outward by the side rods, the teeth of the comb being then brought in contact with the units pins of its respective set, whereby the racks are again moved outward and finally returned to their normal position. It will be apparent that the distance of travel of each comb is determined by the movement of the side rods, which depends upon the throw of the cranks, and, therefore, the combs always move an equal distance both inward and outward. As will be seen from Fig. 27, the pins are arranged in nine sets, one set for each comb, there being nine combs and ten keys, one of the keys, namely, the zero key, not engaging any comb. Moreover, the pins are so graduated on their respective racks as to determine the movement of each rack, according to the product to be represented by such rack. In the machine first described, the depth of the recesses in the disks determined the movement of the racks, and, in the machine now being described, the pins perform the same function as the recesses in the disks, the tens pins corresponding to recesses in the tens disks, while the units pins correspond to the recesses in the units disks. When an upturned comb is drawn outward by the side rods, it, of course, moves those racks the farthest whose pins it first engages, while those racks whose pins are last engaged are moved the shortest distance. Moreover, any rack not provided with a pin in the respective division to which the upturned comb belongs will not be moved, it being apparent that the absence of a pin in this machine is equivalent to an unrecessed sector in the machine first described. As these pins are arranged at proportional or graduated distances from the dividing lines of the respective sets, it is clear that the amount of movement of the racks will be proportional to the key depressed. The space between adjacent division lines may be considered as divided into tenths, and the pins are so located that their distances from their dividing line forward of them will contain respectively as many tenths as such pins are intended to represent in the products. For instance, if the key 1 be depressed, so as to throw its comb into a vertical position, the rods will carry the said comb one tenth of its full distance before the teeth of the comb contact with any pins, the first pin engaged being the pin on rack, $Z^9$, which pair is nine tenths (of the full travel of the comb) from the line between divisions, I and II. The comb will move the rack, $Z^9$, one tenth of the full distance of travel of the rack, when the teeth of the comb will engage the pin on rack, $Z^8$, then moving it, together with rack, $Z^9$, outward another tenth, whereupon it will engage the pin on rack, $Z^7$, and will carry it, together with racks, $Z^8$ and $Z^9$, outward one tenth, then striking the pin on rack, $Z^6$, and moving it, together with racks, $Z^7$, $Z^8$ and $Z^9$, until it reaches the pin on rack, $Z^5$, the operation continuing in the same way, until the comb arrives at the zero line of its limit of outward movement, at which time the pins on racks, $Z'$ to $Z^9$, are all in a line at right angles to the path of the comb. The distance over which the racks travel to reach this position will vary, of course, according to the distance of their respective pins from the said zero line, the pin on rack $Z^9$, moving nine times as far as the pin on rack, $Z'$, the pin on rack, $Z^8$, moving eight times as far as the said pin on rack $Z'$, and so on. As the distance of travel of the racks varies, so, also, the amount of rotation of the counting pinions will vary.

From the description thus far, it will be understood that the racks make two outward movements, during the first of which the comb engages the pins which represent the tens of the product, that is, the pins which produce the primary revolutions of the pinion shafts, after which the comb is moved inward and shifted so that, on its second outward movement it engages the pins which produce the secondary rotations of the pinion shafts.

The totalizing mechanism in this machine is similar to that of the apparatus first described, with the exception that the register spindles are mounted vertically instead of horizontally in the carriage, the carrying dogs being arranged with their spindles vertical, their pins engaging the projections, $y$ and $j$, at the top side of the cylinder, Y. The auxiliary carriage on which the carrying dog spindles are mounted is shifted so as to disengage the carrying dogs from the star-wheels, by means of a pair of cams.

In Figs. 26 and 27, I have illustrated another form of mechanism embodying a part of my invention, namely, the controlling devices, the transmitting and the totalizing mechanisms not being shown, as they are similar to that previously described in connection with Figs. 19 to 25, inclusive. In this construction, the starting mechanism consists of a series of pairs of recessed plates, $I^a$, $I^b$, to $IX^a$ $IX^b$ one pair for each rack, the combs of the previously-described device being replaced by a single comb $Q^{11}$ having long teeth $q^3$, this comb being fixed at each end to vertically-movable racks, mounted in slide-ways carried by the side-rods, and engaged by pinions fixed on a shaft journaled in bearings on the side-rods. The shaft is provided at one end with any suitable mechanism for rotating it, so as to bring the teeth of the comb opposite any desired set of recesses in the plate, as, for instance, the lever fixed to the end of the shaft, this lever $L^9$ serving as a pointer or index and moving over an arc $L^{10}$ provided with numbers which indicate the position of the comb with relation to the recessed plates. For example, if the index be at 5, the teeth of the comb will be opposite the recesses which may be said to represent the products of five. As the side rods are drawn outward by the rotation of the main driving shaft, the comb is also moved outward until its teeth enter the recesses in the starting plates and strike the bottom of such recesses, whereupon the continued outward movement of the side rods and comb will force the racks outward, thereby rotating the counting pinions as before. The comb, of course, always travels a definite distance, which is determined by the throw of the crank which moves the side-rods, but, as the recesses in the plates fixed to the racks vary in depth, some of the teeth in the comb will come into engagement with the bottoms of their respective recesses sooner than the others, thereby moving the racks a distance proportionate to the recesses opposite the comb. The recessing of the plate is done on a scale of tenths, in the same general way as the recessing of the disks in the mechanism first described in connection with Figs. 1, 2, &c.—that is to say, the recesses are graduated in depth, as before mentioned. Moreover, the plates, as before stated, are in pairs and the teeth of the comb engage first with the tens plates and then with the units plates, this being due to the fact that the shaft and the comb are moved in the direction of their lengths, by a cam-rod held outward by a spring, and bearing against a cam on the cam-operating shaft.

From the description of the various forms of machines which have been given, it will be plain that many mechanisms may be employed to embody my invention. Therefore, I do not limit myself to the specific constructions shown and described.

Having thus fully described my invention, what I claim as new, and desire to secure by Letters Patent, is—

1. In a calculating machine, the combination, with a controlling mechanism, and a series of transmitting devices whose movements are determined by the controlling mechanism, of a registering mechanism, and a coupling device arranged to couple any desired transmitting device to the registering mechanism, substantially as set forth.

2. In a calculating machine, a controlling mechanism consisting of controlling devices arranged in pairs, one device of each pair being graduated to correspond to the tens, and the other device of the same pair being graduated to correspond to the units, of the products determined by the said pair of controlling devices, in combination with a series of transmitting devices whose movements are controlled by the controlling mechanism, a registering mechanism, and a coupling device capable of coupling any desired transmitting device to the registering mechanism, substantially as set forth.

3. In a calculating machine, the combination, with a controlling mechanism, of a series of independently-movable racks whose movements are determined by the controlling mechanism, and a pinion arranged so as to be capable of engagement with any desired rack, substantially as set forth.

4. In a calculating machine, the combination, with a controlling mechanism, of a series of racks whose movements are determined by the controlling mechanism, and a series of pinions capable of simultaneous engagement with any desired one of the racks, substantially as set forth.

5. In a calculating machine, the combination, with a controlling mechanism, and a series of racks whose movements are determined by the controlling mechanism, of a series of pinions capable of simultaneous or independent engagement with any desired rack, substantially as set forth.

6. In a calculating machine, the combination, with a series of racks arranged side by side, of a series of pinion shafts extending transversely across all of the racks, and a pinion mounted on each pinion shaft and arranged to engage the racks, substantially as set forth.

7. In a calculating machine, the combination, with a series of racks, and a series of pinion shafts arranged transversely to said racks, of a series of pinions mounted on said shafts, and means for moving each pinion into engagement with any desired rack, substantially as set forth.

8. In a calculating machine, the combination, with a series of racks arranged side by side, and a series of pinion shafts extending transversely across all of said racks, of a series of pinions movable on the shafts longitudinally, of the latter, a series of pinion-moving buttons engaging the pinions and provided with indices, and a graduated scale over which the indices move, substantially as set forth.

9. In a calculating machine, the combination, with a series of racks, of a pinion shaft having a polygonal cross section, and a pinion mounted on said shaft and arranged to move longitudinally thereon, whereby the said pinion will be rotated by the shaft, and may be engaged with any desired rack, substantially as set forth.

10. In a calculating machine, the combination, with a controlling mechanism, and a series of racks whose movements are determined by the controlling mechanism, of a pinion shaft having a polygonal cross section, a pinion mounted on said shaft and arranged to move longitudinally thereon, and means for shifting said pinion into engagement with any desired rack, substantially as set forth.

11. In a calculating machine, the combination, with a pair of controlling devices, of a transmitting mechanism, and means for shifting the controlling devices so as to engage either one of the pair with the transmitting mechanism, substantially as set forth.

12. In a calculating machine, the combination, with a plurality of pairs of graduated controlling devices, each pair being graduated differently from any other pair, of a series of transmitting devices, one for each pair of controlling devices, the transmitting devices being capable of simultaneous engagement with their respective controlling devices, substantially as set forth.

13. In a calculating machine, the combination, with a plurality of pairs of graduated controlling devices, each pair being graduated differently from any other pair, of a series of transmitting devices, one for each pair of controlling devices, a registering mechanism operated by the transmitting devices, and means for setting the controlling devices according to the figures of the multiplier, substantially as set forth.

14. In a calculating machine, the combination, with a controlling mechanism, and a series of racks whose movements are determined by the controlling mechanism, of a registering mechanism movable in a direction parallel to that of the movement of the racks, substantially as set forth.

15. In a calculating machine, the combination, with a controlling mechanism, and a plurality of racks whose movements are determined by the controlling mechanism, of a series of counting pinions each arranged to be shifted into engagement with any rack, and a registering device actuated by the pinions and movable independent thereof, substantially as set forth.

16. In a calculating machine, a controlling mechanism consisting of controlling devices arranged in pairs, one for the tens and one for the units of the products determined by each pair of controlling devices, in combination with a transmitting mechanism stationary in a lateral direction, and means for moving the controlling devices laterally with relation to the transmitting mechanism, whereby either the controlling devices for the units or the controlling devices for the tens are brought into engagement with the transmitting mechanism, substantially as set forth.

17. In a calculating machine, a series of recessed controlling disks, and means for rotating the selected disks to the desired extent, in combination with a series of racks whose movements are determined by the controlling disks, and a series of counting pinions arranged one in advance of the other, and means whereby the counting pinions may be brought simultaneously into engagement with any desired rack, substantially as set forth.

18. In a calculating machine, a plurality of controlling devices, a plurality of racks whose movements are determined by the controlling devices, a series of pinion shafts, a series of counting pinions on the pinion shafts, and means for moving each counting pinion into engagement with any desired rack, substantially as set forth.

19. In a calculating machine, a registering mechanism comprising a series of register dials, a series of register spindles on which the dials are mounted, a series of star wheels fixed on the register spindles, a series of dog spindles, a series of carrying dogs on the dog spindles, a series of pairs of fingers, one finger of each pair being fixed on its respective register spindle, and the other finger of the same pair being fixed on its respective dog spindle, and means for swinging the carrying dogs, substantially as set forth.

20. In a calculating machine, the combination, with a series of register spindles, and a series of dials fixed thereon, of a revoluble cylinder provided with a plurality of pairs of laterally-acting cam teeth, one pair for each spindle, and mechanism interposed between the cam teeth and the register spindles whereby the dials are moved by the cam teeth in either direction, substantially as set forth.

21. In a calculating machine, the combination, with a series of register spindles, and a series of dials fixed thereon, of a revoluble cylinder provided with a plurality of pairs of spirally-arranged laterally-acting cam teeth, and mechanism interposed between the cam teeth and the register spindles whereby the dials are moved successively in either direction, substantially as set forth.

22. In a calculating machine, the combination, with a series of register spindles, and a series of dials fixed thereon, of a revoluble cylinder provided with a plurality of pairs of cam teeth, the cam faces of the teeth of each pair sloping in opposite directions, mechanism interposed between the cam teeth and the register spindles, and means for shifting said mechanism into engagement with either series of the cam surfaces, whereby the direction of rotation of the dials may be changed, substantially as set forth.

23. In a calculating machine, the combination, with a series of register spindles, a series of dials and a series of star wheels fixed on the spindles, a series of dog spindles, a series of carrying dogs fixed thereon, and means for communicating motion from each register spindle to its dog spindle, of means for shifting the carrying dogs into or out of engagement with the star wheel of the register spindles directly above them, substantially as set forth.

24. In a calculating machine, the combination, with an upper and a lower carriage, of a series of register spindles mounted in the upper carriage, a series of dials and star wheels fixed thereon, a series of dog spindles mounted in the lower carriage, means for transferring motion from the register spindles to the dog spindles, a series of dogs actuated by the dog spindles and arranged to engage the star wheels, and means for moving the carriages with relation to each other, substantially as set forth.

25. In a calculating machine, the combination, with a register carriage, and a comb attached to the carriage, of a longitudinally-movable shifting bar arranged to engage the comb, substantially as set forth.

26. In a calculating machine, the combination, with a register carriage, and a comb attached to the carriage, of a longitudinally-movable shifting bar arranged to engage any one of the teeth on the comb, substantially as set forth.

27. In a calculating machine, the combination, with a register carriage, and a comb attached to the carriage, of a longitudinally-movable shifting bar provided with a nose arranged to engage any one of the teeth on the comb, and a cam wheel for operating the shifting bar, substantially as set forth.

28. In a calculating machine, the combination, with a register carriage, and a shifting bar, of mechanism for shifting the carriage transversely into or out of engagement with the shifting bar, and means for moving the bar, substantially as set forth.

29. In a calculating machine, the combination, with a register carriage, and a comb attached to the carriage, of a shifting bar, means for operating the shifting bar, and mechanism for moving the carriage transversely into or out of engagement with the shifting bar, substantially as set forth.

30. In a calculating machine, the combination, with a register carriage, of a comb pivotally attached to the carriage, a shifting bar provided with a nose arranged to engage any one of the teeth on the comb, means for operating the shifting bar, and mechanism for lifting the comb out of engagement with the nose on the shifting bar, substantially as set forth.

31. In a calculating machine, the combination, with a register carriage, and a comb pivotally attached to the carriage, of a shifting bar provided with a nose arranged to engage any one of the teeth on the comb, a cam for pushing the shifting bar in one direction, and a spring attached to the shifting bar and tending to force the shifting bar in the opposite direction, substantially as set forth.

32. In a calculating machine, the combination, with a register carriage, of a comb attached to the carriage, a shifting bar provided with a nose arranged to engage any one of the teeth on the comb, means for operating the shifting bar, and mechanism for moving the carriage transversely whereby the comb may be moved out of its position of engagement with the nose on the shifting bar, substantially as set forth.

33. In a calculating machine, the combination, with a register carriage, and a comb attached to the carriage, of a shifting bar provided with a nose arranged to engage any one of the teeth on the comb, and a cam wheel having a lateral cam face for operating the shifting bar, and a peripheral cam face for moving the carriage transversely, substantially as set forth.

34. In a calculating machine, the combination, with a register carriage, and a cam-operating shaft, of a cam-wheel fixed on the cam-operating shaft, and having peripheral and lateral cam faces, of a roller carried by the register carriage and engaging the peripheral cam face of the cam wheel, a comb attached to the carriage, a shifting bar provided with a nose arranged to engage any one of the teeth on the comb, and with a roller engaging the lateral cam face of the cam wheel, a spring holding the roller of the main carriage in contact with the peripheral cam face, and a spring secured to the shifting bar and holding its roller in contact with the lateral cam face, substantially as set forth.

35. In a calculating machine, the combination, with a series of pinion shafts, and a series of counting pinions mounted on said shafts, of a series of register spindles, a carriage in which the register spindles are mounted, means for moving the carriage alternately in a longitudinal and in a transverse direction, and means for coupling the pinion shafts to the register spindles, whereby each register spindle will be first rotated by one pinion shaft and then moved into engagement with an adjacent pinion shaft, substantially as set forth.

36. In a calculating machine, the combination, with a series of pinion shafts, and a series of counting pinions mounted on said shafts, of a pin disk on each shaft, a series of register spindles, a perforated disk on each spindle, a carriage on which the spindles are mounted, means for moving the carriage longitudinally, and means for engaging the pin disks and the perforated disks, whereby motion is imparted from one counting pinion to its opposite register spindle and then to the next adjacent spindle, substantially as set forth.

In testimony that I claim the foregoing as my invention I have signed my name in presence of two subscribing witnesses.

OTTO STEIGER.

Witnesses:
C. MAYER,
ALBERT WEICKMAN.